US011459192B2

(12) United States Patent
Kirihara et al.

(10) Patent No.: US 11,459,192 B2
(45) Date of Patent: Oct. 4, 2022

(54) CONTAINER SUPPLY DEVICE AND CONTAINER SUPPLY METHOD

(71) Applicant: KABUSHIKI KAISHA YASKAWA DENKI, Fukuoka (JP)

(72) Inventors: Koichi Kirihara, Fukuoka (JP); Haruhiko Koike, Fukuoka (JP); Koji Hara, Fukuoka (JP); Tomoya Hyodo, Fukuoka (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 0 days.

(21) Appl. No.: 17/090,984

(22) Filed: Nov. 6, 2020

(65) Prior Publication Data

US 2021/0139258 A1 May 13, 2021

(30) Foreign Application Priority Data

Nov. 13, 2019 (JP) .............................. JP2019-205251

(51) Int. Cl.
*B65G 59/06* (2006.01)
*B65G 61/00* (2006.01)
*B65B 43/42* (2006.01)
*B65B 7/28* (2006.01)

(52) U.S. Cl.
CPC ........... *B65G 59/063* (2013.01); *B65G 61/00* (2013.01); *B65B 7/28* (2013.01); *B65B 43/42* (2013.01); *B65G 2201/0235* (2013.01)

(58) Field of Classification Search
CPC ........ B65G 59/063; B65G 61/00; B65B 7/28; B65B 43/42
See application file for complete search history.

(56) References Cited

U.S. PATENT DOCUMENTS 10,807,810 B2 * 10/2020 Tanoue ................ B65G 59/063
2019/0023503 A1 1/2019 Tanoue et al.

FOREIGN PATENT DOCUMENTS

EP 2799350 A1 11/2014
JP S62-028708 U1 2/1987
JP H01-168407 U1 11/1989
(Continued)

OTHER PUBLICATIONS

An Office Action dated Feb. 23, 2022, issued from the China National Intellectual Property Administration (CNIPA) of Chinese Patent Application No. 202010865073.2 (Chinese counterpart of the present application) and a EN translation thereof (19 pages).

(Continued)

*Primary Examiner* — Lynn E Schwenning
(74) *Attorney, Agent, or Firm* — Venjuris, P.C.

(57) ABSTRACT

A container supply device includes a guide plate that guides stacking of a plurality of lids in a vertical direction, a lower claw capable of advancing/retreating and mounting a first container located at the lowermost position in a plurality of stacked containers, an upper claw capable of advancing/retreating and including a recess into which a flange portion of a second container sequentially stacked on the first container in the plurality of stacked containers is inserted, and a suction pad that adsorbs and separates the first container from the second container in a state where the second container is supported by the upper claw.

17 Claims, 21 Drawing Sheets

(56) References Cited

FOREIGN PATENT DOCUMENTS

| JP | 2011-152980 A | 8/2011 |
|----|---------------|--------|
| JP | 2019-023087 A | 2/2019 |
| JP | 2019-048364 A | 3/2019 |
| KR | 10-2019-0010485 A | 1/2019 |

OTHER PUBLICATIONS

An Office Action dated Feb. 23, 2022, issued from the China National Intellectual Property Administration (CNIPA) of Chinese Patent Application No. 202010865073.2 (Chinese counterpart of the present application) and a EN translation thereof.

* cited by examiner

CONTAINER SUPPLY DEVICE AND CONTAINER SUPPLY METHOD

CROSS-REFERENCE TO RELATED APPLICATION

This application is based on and claims priority from Japanese Patent Application No. 2019-205251 filed on Nov. 13, 2019 with the Japan Patent Office, the disclosure of which is incorporated herein in its entirety by reference.

TECHNICAL FIELD

The present disclosure relates to a container supply device and a container supply method.

BACKGROUND

Japanese Patent Laid-Open Publication No. 2019-023087 discloses a configuration in which a first lid (e.g., a first container) located at the lowermost position in a plurality of lids stacked along a guide bar is separated. In order to separate the first lid, an upper claw of a lid supply device is inserted into a lower portion of a second lid (e.g., a second container) sequentially stacked on the first lid in the plurality of stacked lids, and an end portion of the second lid is mounted on the upper claw.

SUMMARY

According to an aspect of the present disclosure, a container supply device is provided which includes: a guide member that guides stacking of a plurality of containers stacked in a vertical direction; a first support member capable of advancing and retreating with respect to the plurality of containers to mount a first container located at a lowermost position of the plurality of stacked containers thereon; a second support member capable of advancing and retreating with respect to the plurality of containers, and including a recess into which an edge portion of a second container sequentially stacked on the first container in the plurality of stacked containers is inserted; and a separation member that separates the first container from the second container in a state where the second container is supported by inserting the edge portion of the second container into the recess of the second support member.

Further, according to another aspect of the present disclosure, a container supply method is provided which includes: moving a first support member in a direction substantially orthogonal to a vertical direction toward a plurality of containers guided by a guide member and stacked in the vertical direction to mount a first container located at a lowermost position in the plurality of containers on the first support member; in a state where the first container is supported by the first support member, moving a second support member in the direction substantially orthogonal to the vertical direction toward the plurality of containers and inserting an edge portion of a second container sequentially stacked on the first container in the plurality of containers into a recess provided in the second support member to mount the second container on the second support member; and in a state where the second container is supported by the second support member, moving the first support member away from the plurality of containers to separate the first container from the second container.

The foregoing summary is illustrative only and is not intended to be in any way limiting. In addition to the illustrative aspects, embodiments, and features described above, further and additional aspects, embodiments, and features will become apparent by reference to the drawings and the following detailed description.

DETAILED DESCRIPTION

In the following detailed description, reference is made to the accompanying drawings, which form a part thereof. The illustrative embodiments described in the detailed description, drawings, and claims are not meant to be limiting. Other embodiments may be utilized, and other changes may be made without departing from the spirit or scope of the subject matter presented here.

Since the container supply device of the above-mentioned related art has a configuration in which only the second container (lid) from the bottom is mounted and supported, the second container from the bottom may not be sufficiently held according to the shape and the stacked state of the containers, and thus, the container located at the lowermost position may not be reliably separated.

The present disclosure has been made in view of the above-mentioned problems and provides a container supply device and a container supply method capable of reliably separating a container located at the lowermost position among a plurality of stacked containers.

Hereinafter, an embodiment will be described with reference to the accompanying drawings. The present embodiment is an example in which the container supply device according to the present disclosure is applied to a lid supply device that supplies a lid attached to, for example, a food container. Further, in the following description, the vertical direction, the front and rear direction, and the left and right direction correspond to the arrow directions appropriately illustrated in each figure. However, the description of the directions such as up, down, left, right, front, and rear is used for convenience of explanation, and does not limit the positional relationship of each configuration of the lid supply device.

Entire Configuration of Lid Closing System

First, descriptions will be made on an entire configuration example of a lid closing system S including the lid supply device 2 according to the present embodiment.

Figure 1:
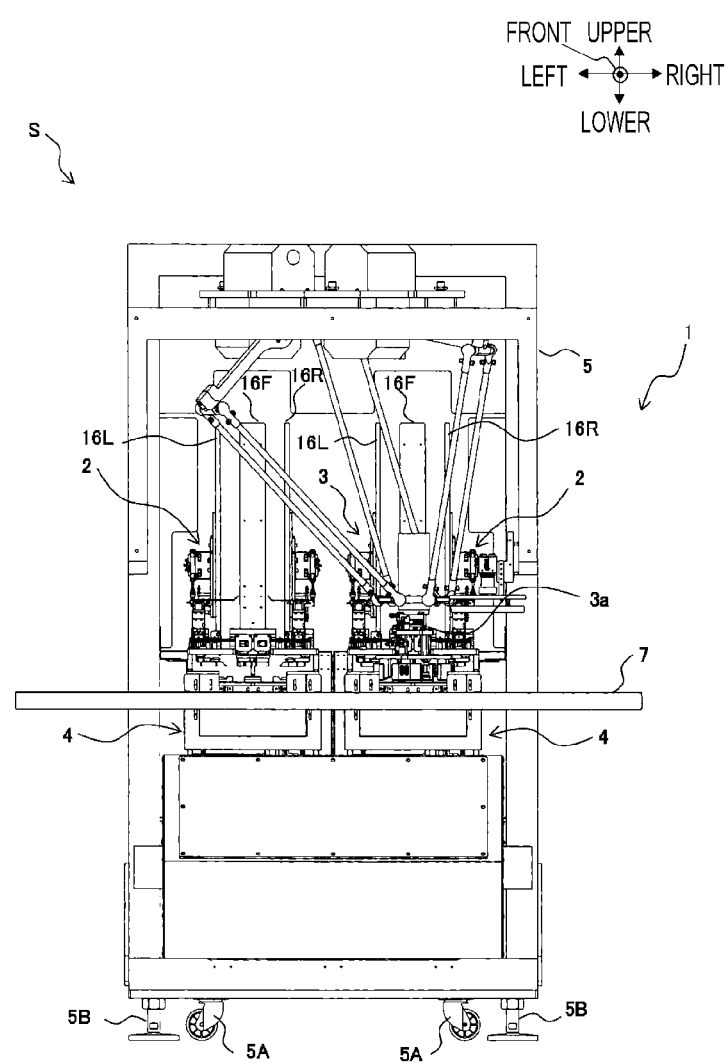
FIG. 1 is a front view illustrating an example of a lid (cover) closing system including a lid supply device according to an embodiment.
Figure 2:
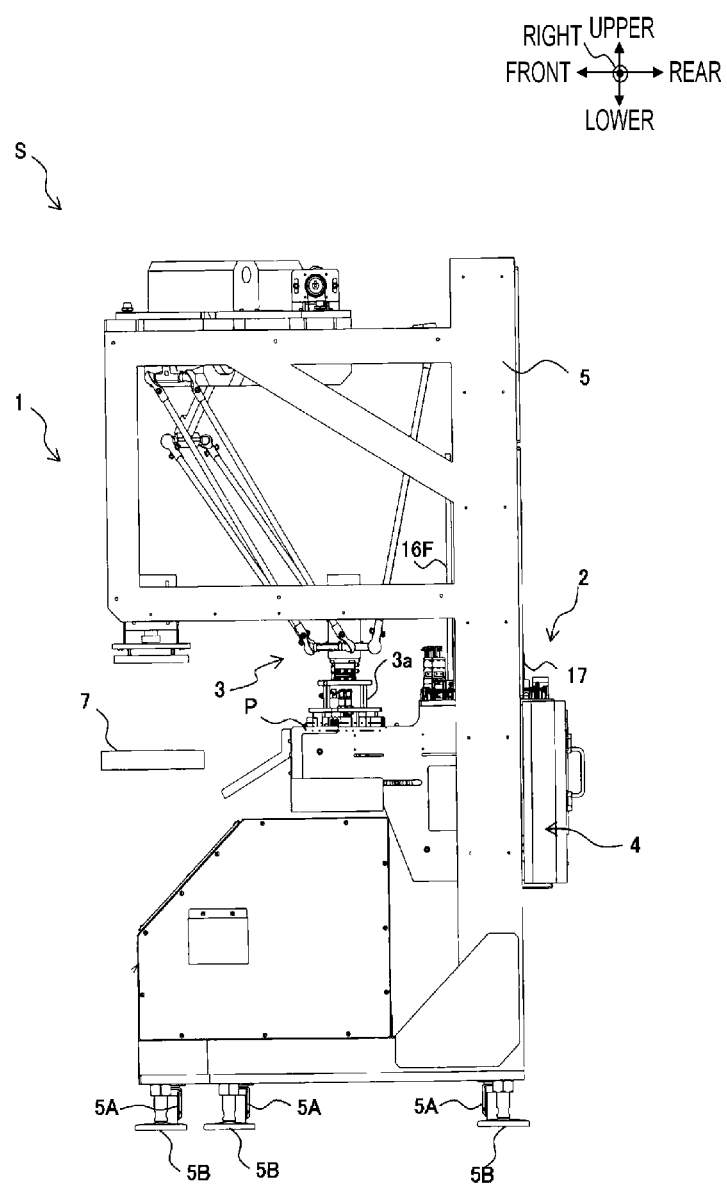
FIG. 2 is a side view from the right illustrating an example of the lid closing system.

As illustrated in FIGS. 1 and 2, the lid closing system S includes a lid closing unit 1 and a container transfer conveyor 7. The lid closing unit 1 includes two lid supply devices 2 and 2, two lid transfer devices 4 and 4, one lid closing robot 3, and a pedestal 5 on which the lid supply devices 2 and 2, the lid transfer devices 4 and 4, and the lid closing robot 3 are mounted. The lid closing robot 3 is commonly provided for the two lid supply devices 2 and 2. The pedestal 5 may travel by wheels 5A and, after traveling, may be made stationary by a stopper 5B. The container transfer conveyor 7 transfers a plurality of food containers in which, for example, foods such as rice and side dishes are arranged at regular intervals in the transfer direction (not illustrated). The container transfer conveyor 7 may be operated in an intermittent operation in which the transfer and the stop are repeated, or may be operated in a continuous operation in which the container is continuously transferred.

Figure 3:
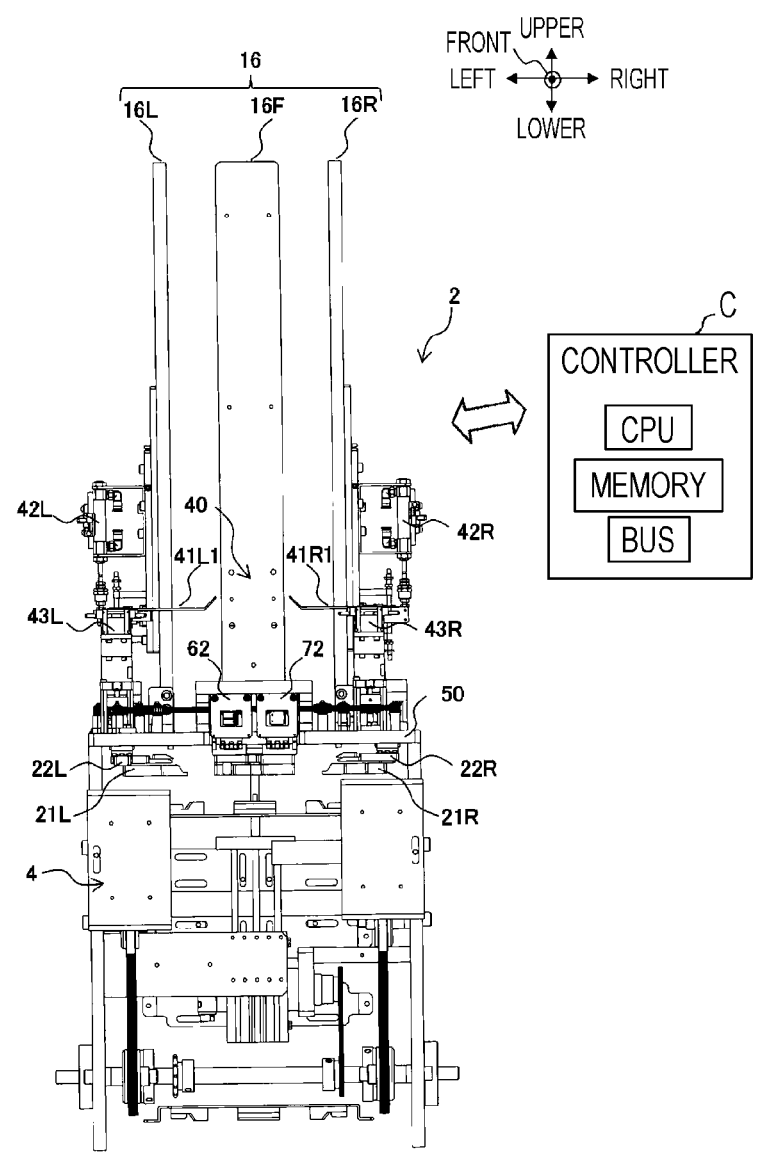
FIG. 3 is a front view illustrating an example of the entire configuration of the lid supply device and a lid transfer device.
Figure 4:
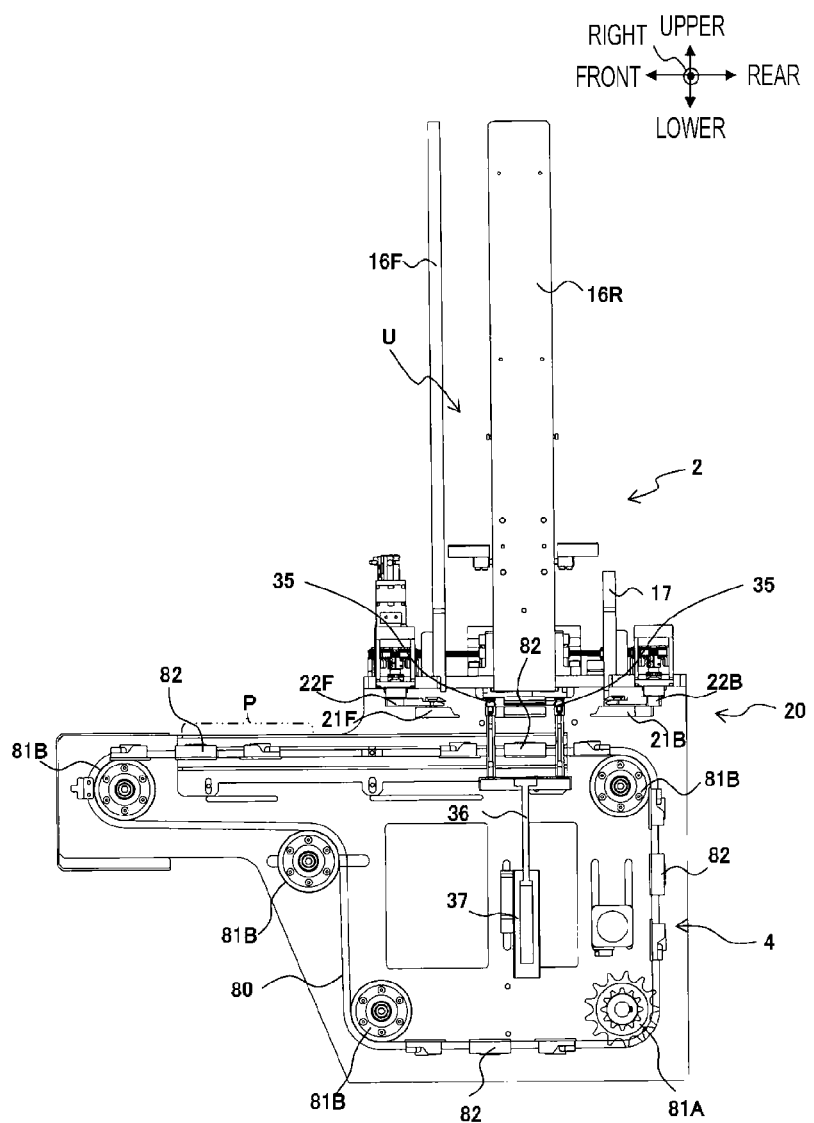
FIG. 4 is a partial perspective side view from the right illustrating an example of the entire configuration of the lid supply device and the lid transfer device.
Figure 5:
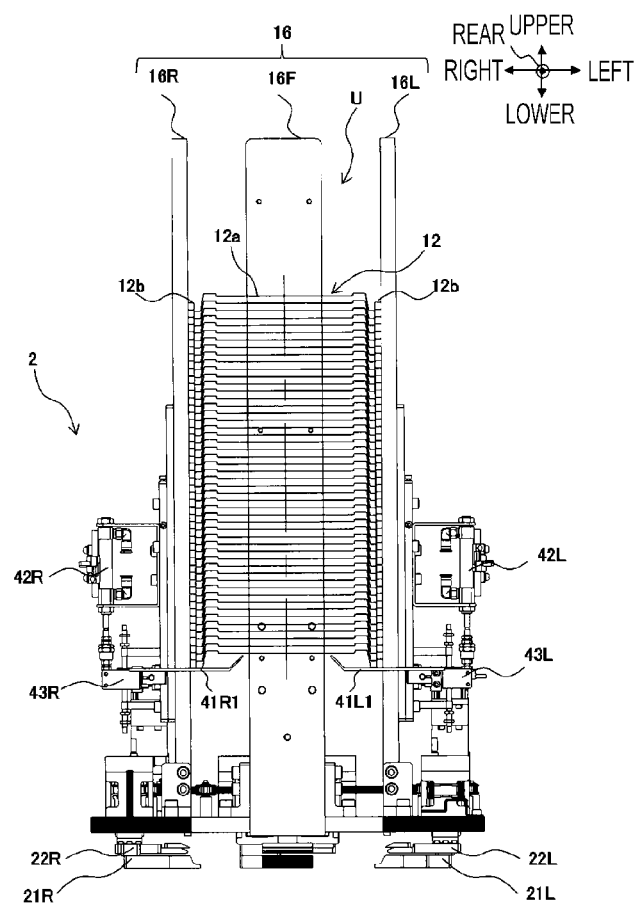
FIG. 5 is a rear view illustrating an example of a state in which a lid is mounted on the lid supply device in a simplified manner.

A configuration example of the lid supply device 2 and the lid transfer device 4 is illustrated in FIGS. 3 and 4. In FIGS. 3 and 4, each lid supply device 2 accommodates a plurality of lids 12 (e.g., containers) stacked in a vertical direction. FIG. 5 illustrates an example of a state in which a lid is mounted on a single lid supply device 2. In this example, the lid 12 is a shallow dish-shaped container having a substantially square (or a substantially circular) shape in a plan view from above (or below). That is, the lid 12 includes a main body portion 12a (e.g., a container main body portion) located on the radial center side, and a flange portion 12b (e.g., an edge portion) protruding on the radial outer side of the main body portion 12a. Each lid supply device 2 separates the plurality of stacked lids 12 one by one from the lowermost position of the plurality of stacked lids 12 and delivers the lid 12 separated from the stack to the lid transfer device 4 arranged below the lid supply device 2 (details will be described later). Each lid transfer device 4 transfers the lid 12 delivered from the corresponding lid supply device 2 to a lid receiving position P of the lid closing robot 3. At this time, the two lid transfer devices 4 and 4 are controlled by a controller C in cooperation with each other so that the lid 12 is alternately transferred to the lid receiving position P by a known method. In this way, the cycle time may be shortened by arranging two sets of the lid supply device 2 and the lid transfer device 4 and performing a process of supplying the lid to the lid closing robot 3 in parallel.

In this example, the lid closing robot 3 is configured as a parallel link type robot, and is provided with an appropriate suction tool 3a. The lid closing robot 3 may be configured in other forms such as a linear motion type, a vertical articulated type, and a horizontal articulated type, instead of the parallel link type. Based on the control of the controller C, the lid closing robot 3 grips and holds the lid 12, which is transferred to the lid receiving position P by the two lid transfer devices 4 and 4, by the suction tool 3a. Then, the lid closing robot 3 moves the gripped lid 12 and sequentially attaches the lid 12 to the food container that is moving (or stopped) on the container transfer conveyor 7. Further, as illustrated in FIGS. 1 and 2 described above, the pedestal 5 is arranged relatively close to the container transfer conveyor 7 so that the container transfer conveyor 7 is located within the movable range of the suction tool 3a of the lid closing robot 3 and the lid 12 is smoothly attached.

As illustrated in FIG. 4, the lid transfer device 4 includes a chain 80 that is circulated and driven by being bridged by a drive roller 81A and a plurality of driven rollers 81B, and a plurality of transfer bases 82 provided at a plurality of locations of the chain 80. The transfer base 82 transfers the lid 12 to the lid receiving position P while restraining the outer shape and inner shape of the lid 12. This prevents the lid 12 from being displaced or rotated when the chain 80 is being driven and transferred. Further, the drive roller 81A is driven by, for example, a servomotor controlled by the controller C. By using the servomotor, the transfer base 82 may be positioned with high accuracy and high reproducibility with respect to the lid receiving position P. In addition, by using a chain drive, it is possible to avoid the occurrence of backlash.

Configuration of Lid Supply Device

Next, a configuration example of the lid supply device 2 will be described. The lid supply device 2 is an example of a container supply device.

As illustrated in FIGS. 6 to 9, the lid supply device 2 includes a plurality of guide plates 16, a separation mechanism 20, and a lifting mechanism 40.

Guide Plate

In this example, a guide plate 16 (e.g., a guide member) is built with a total of three plates (i.e. a left guide plate 16L positioned on the left, a right guide plate 16R positioned on the right, and a front guide plate 16F positioned on the front side between the left guide plate 16L and the right guide plate 16R) being erected in a substantially vertical direction with respect to a substantially square plate-shaped base 50. These guide plates 16L, 16R, and 16F are members that contact an outer peripheral portion of the lid 12 and guide the stacking direction when the lids 12 are stacked. Hereinafter, when these guide plates 16L, 16R, and 16F are collectively referred to without distinction, they are simply referred to as a "guide plate 16." Further, an auxiliary guide plate 17 having a shorter length in the height direction than the guide plates 16L, 16R, and 16F is provided on the rear side between the left guide plate 16L and the right guide plate 16R. Then, in this example, a plurality of (e.g., 100 to 150) lids 12 are thrown into an internal space U surrounded by the guide plates 16L, 16R, and 16F from the rear side of the lid supply device 2 via the upper side of the auxiliary guide plate 17 by the operator, and are stacked in the vertical direction while being guided by the guide plates 16L, 16R, and 16F in the internal space U.

That is, as illustrated in FIG. 5 described above, the left guide plate 16L is arranged to come into contact with the left end portion of the outer peripheral portion of each of the stacked lids 12 (e.g., the left flange portion 12b), the right guide plate 16R is arranged to come into contact with the right end portion of the outer peripheral portion of each of the stacked lids 12 (e.g., the right flange portion 12b), and the front guide plate 16F is arranged to come into contact with the front end portion of the outer peripheral portion of each of the stacked lids 12 (e.g., the front flange portion 12b). Further, the number and arrangement of the guide plates 16 may be other than the embodiment described above as long as the stacking direction of the lids 12 may be guided.

Separation Mechanism

The separation mechanism 20 is a mechanism that separates (e.g., demounts) the lids 12 one by one from the plurality of lids 12 stacked along the guide plate 16. As illustrated in above-described FIG. 4 and FIGS. 6, 7, and 8, the separation mechanism 20 includes a lower claw 21, an upper claw 22, a suction pad 35, a lower claw drive actuator 31, an upper claw drive actuator 32, and a demounting drive actuator 37. The lower claw 21 and the upper claw 22 are configured to be replaceable according to the shape and size of the lid 12.

Lower Claw

The lower claw 21 (e.g., the first support member) is a member on which the first lid 12 located at the lowermost position among the plurality of lids 12 stacked in the internal space U (see, e.g., the lid 12A of FIGS. 16 and 17 to be described later) is mounted and supported, and in this example, a total of four claws are provided. That is, two elements (i.e., a right lower claw 21R and a left lower claw 21L) which are located on one side (e.g., a right side in this example) and the other side (e.g., a left side in this example) of a direction substantially orthogonal to the lid 12 in the vertical direction (e.g., a left and right direction in this example, as an example of a first direction), respectively, are first provided. In addition, two elements (i.e., a front side lower claw 21F and a rear side lower claw 21B) which are located on one side (e.g., front side in this example) and the other side (e.g., rear side in this example) of a direction substantially orthogonal to the lid 12 in the vertical direction and substantially orthogonal to the left and right direction (e.g., front and rear direction in this example, and an example of a second direction), respectively, are provided. The number of lower claws 21 is not limited to four and may be more than four or less depending on how reliably it is necessary (or not necessary) to perform various functions described later.

Since the right lower claw 21R and the left lower claw 21L are provided to be able to advance and retreat in the left and right direction, and the front lower claw 21F and the rear lower claw 21B are provided to be able to advance and retreat in the front and rear direction, each of the claws moves away from and approaches the lid 12 (details will be described later). Hereinafter, when these right lower claw 21R, left lower claw 21L, front lower claw 21F, and rear lower claw 21B are collectively referred to without distinction, they are simply referred to as a "lower claw 21."

Figure 10A:
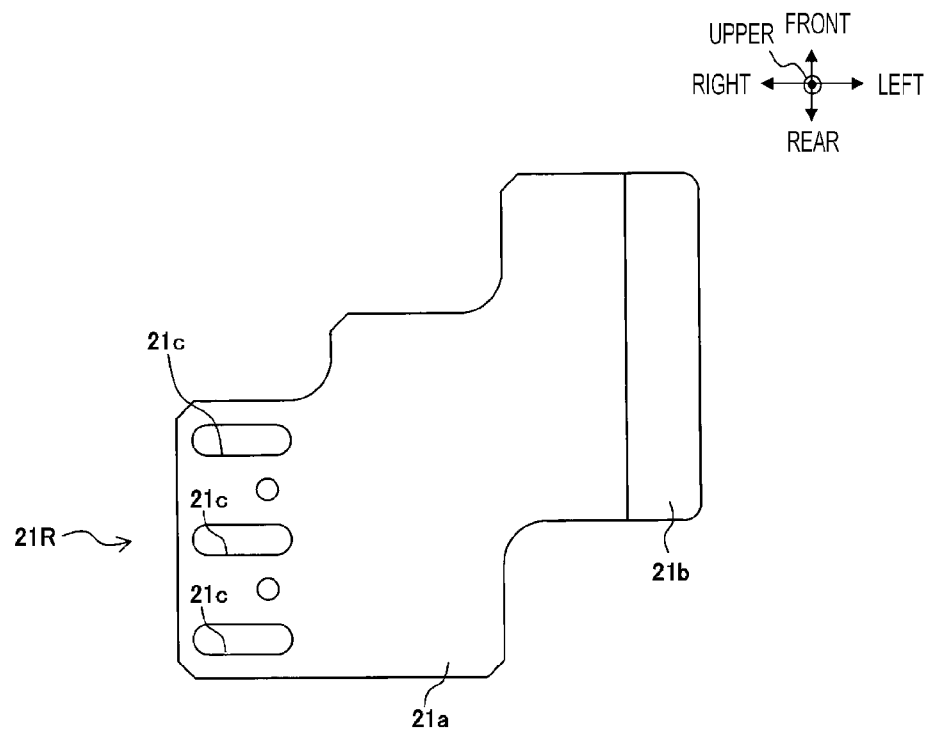
FIGS. 10A and 10B are a top view and a side view illustrating an example of the detailed structure of a right lower claw, respectively.
Figure 10B:
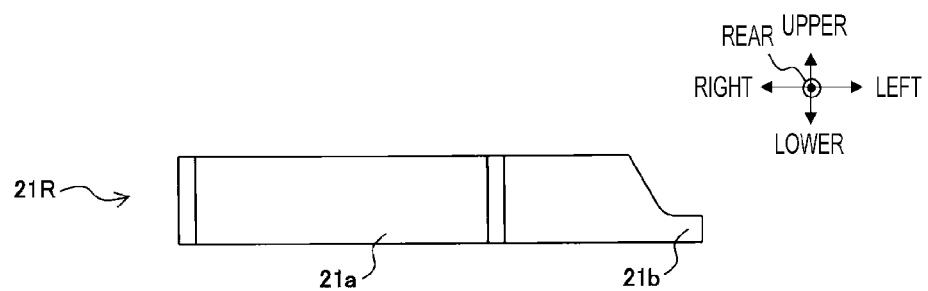

The detailed structure of the right lower claw 21R is illustrated in FIGS. 10A and 10B. As illustrated in the figures, the right lower claw 21R includes a base portion 21a which has substantially the same thickness dimension as a flat plate, a tip portion 21b which is provided integrally on a tip end side of the base portion 21a and has a thickness dimension smaller than that of the base portion 21a, and a mounting hole 21c which is provided in the base portion 21a and connects with a mounting tool (not illustrated) that transmits a driving force from a driving unit 7 (to be described later). Further, the left lower claw 21L, the front lower claw 21F, and the rear lower claw 21B have the same structure as the right lower claw 21R (not illustrated), and function in the same manner as the right lower claw 21R.

Upper Claw

The upper claw 22 (e.g., the second support member) is a member that supports the second lid 12 sequentially stacked on the first lid 12 among the plurality of lids 12 stacked in the internal space U (see, e.g., the lid 12B of FIGS. 16 and 17 described later), and in this example, a total of four claws are provided. That is, two elements (i.e., a right upper claw 22R and a left upper claw 22L) which are located on one side (e.g., a right side in this example) and the other side (e.g. a left side in this example) of a direction substantially orthogonal to the lid 12 in the vertical direction (e.g., a left and right direction in this example, as an example of a first direction), respectively, are first provided. In addition, two elements (i.e., a front side upper claw 22F and a rear side upper claw 22B) which are located on one side (e.g., a front side in this example) and the other side (e.g., a rear side in this example) of a direction substantially orthogonal to the lid 12 in the vertical direction and substantially orthogonal to the left and right direction (e.g., a front and rear direction in this example, as an example of a second direction), respectively, are provided. The number of upper claws 21 is not limited to four and may be more than four or less depending on how reliably it is necessary (or not necessary) to perform various functions described later.

Since the right upper claw 22R and the left upper claw 22L are provided to be able to advance and retreat in the left and right direction, and the front upper claw 22F and the rear upper claw 22B are provided to be able to advance and retreat in the front and rear direction, each of the claws moves away from and approaches the lid 12 (details will be described later). Hereinafter, when these right upper claw 22R, left upper claw 22L, front upper claw 22F, and rear upper claw 22B are collectively referred to without distinction, they are simply referred to as an "upper claw 22."

Figure 11A:
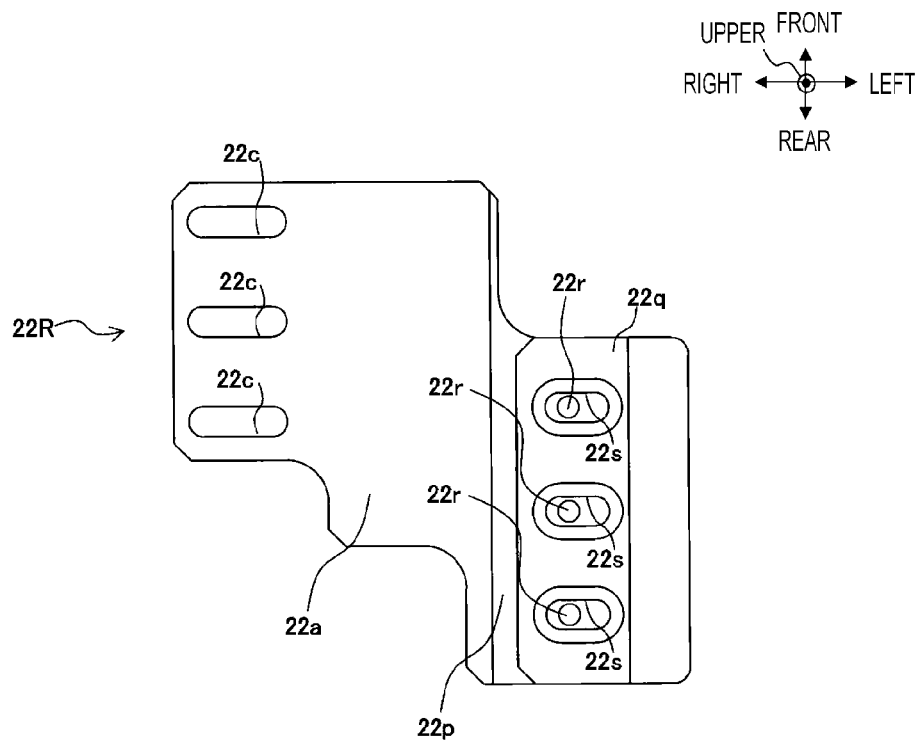
FIGS. 11A and 11B are a top view and a side view illustrating an example of the detailed structure of a right upper claw, respectively.
Figure 11B:
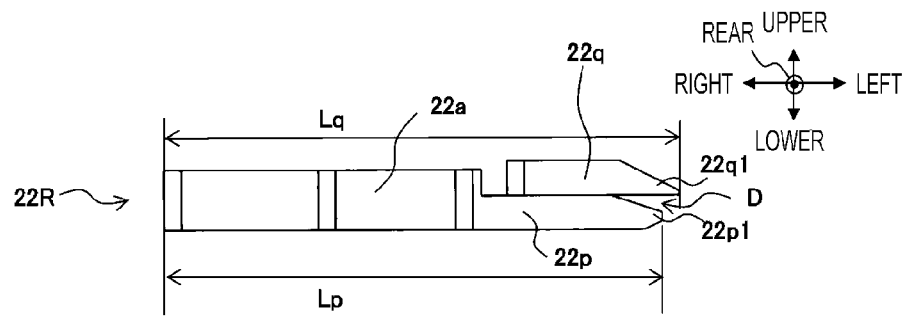

The detailed structure of the right upper claw 22R is illustrated in FIGS. 11A and 11B. As illustrated in the figures, the right upper claw 22R includes a base portion 21a which has substantially the same thickness dimension as a flat plate, a lower wall portion 22p which is integrally provided on a tip end side of a base portion 22a and has a thickness dimension smaller than that of the base portion 22a, an upper wall portion 22q which is attached to the lower wall portion 22p via an appropriate fastener 22r, a mounting hole 22c which is provided in the base portion 22a and connects with a mounting tool (not illustrated) that transmits a driving force from the driving unit 72 (to be described later), and an elongated hole 22s which is provided on the lower wall portion 22p and is extended in the left and right direction through which the fastener 22r penetrates.

The lower wall portion 22p is provided with a tapered portion 22p1 having a shape which is tapered toward the tip end at an end portion located on the lid 12 side. Further, the upper wall portion 22q is provided with a tapered portion 22q1 having a shape which is tapered toward the tip end at an end portion located on the lid 12 side. Then, the upper wall portion 22q and the lower wall portion 22p are configured such that the protrusion amount of the upper wall portion 22q in the advancing/retreating direction (e.g., a right direction in the illustrated example) is larger than the protrusion amount of the lower wall portion 22p. That is, as illustrated in FIG. 11B, for example, when the left end of the base portion 22a is used as a reference, a left and right dimension Lq of the upper wall portion 22q is larger than a left and right dimension Lp of the lower wall portion 22p. At this time, the flange portion 12b of the second lid 12 sequentially stacked on the first lid 12 is inserted into the recess D formed between the upper wall portion 22q and the lower wall portion 22p. In other words, the lower wall portion 22p contacts the flange portion 12b of the second lid 12 sequentially stacked on the first lid 12 by the upper surface of the tapered portion 22p1 from below and mounts the flange portion 12b of the second lid 12. As a result, the second lid 12 sequentially stacked on the first lid 12 is supported (see, e.g., the lid 12B of FIG. 17 described later). Meanwhile, the upper wall portion 22q horizontally presses and supports a main body portion 12d (e.g., the side of the container body portion) which is located radially inside the flange portion 12b and radially outside the main body portion 12a of the third lid 12 sequentially stacked on the second lid 12 in the plurality of lids 12 stacked in the internal space U (see, e.g., the lid 12C of FIG. 17 described later) by the protruding tip of the tapered portion 22q1.

Further, the degree of protrusion of the upper wall portion 22q with respect to the lower wall portion 22p (e.g., the value of Lq-Lp in the above example) at this time may be manually adjusted as appropriate. That is, by setting the fastener 22r in a loosened state, the position of the fastener 22r that connects the lower wall portion 22p and the upper wall portion 22q may be freely set within the range of the elongated hole 22s. As a result, when the fastener 22r is refastened in a state where the loosened fastener 22r is positioned at the right end in the elongated hole 22s, the upper wall portion 22q is most projected from the lower wall portion 22p in the right direction in the figure (e.g., in the above example, the value of Lq-Lp is the maximum). In contrast, when the fastener 22r is refastened in a state where the loosened fastener 22r is positioned at the left end in the elongated hole 22s, the amount of protrusion of the upper wall portion 22q in the right direction in the above figure becomes the smallest (e.g., in the above example, the value of Lq-Lp is the minimum). Here, the upper wall portion 22q may be integrally provided on the tip end side of the base portion 22a which is contrary to the description above, and the lower wall portion 22p may be provided to be able to advance and retreat through the elongated hole and the fastener as described above. In this case, the lower wall portion 22p is attached to the upper wall portion 22q such that the amount of protrusion is adjustable, and in this configuration, the amount of protrusion of the lower wall portion 22p in the advancing/retreating direction may be adjusted to be smaller than the amount of protrusion of the upper wall portion 22q in the advancing/retreating direction.

The left upper claw 22L, the front upper claw 22F, and the rear upper claw 22B also have the same structure as the right upper claw 22R (not illustrated), and have the same function as the right upper claw 22R.

Upper Claw Drive Actuator

Figure 7:
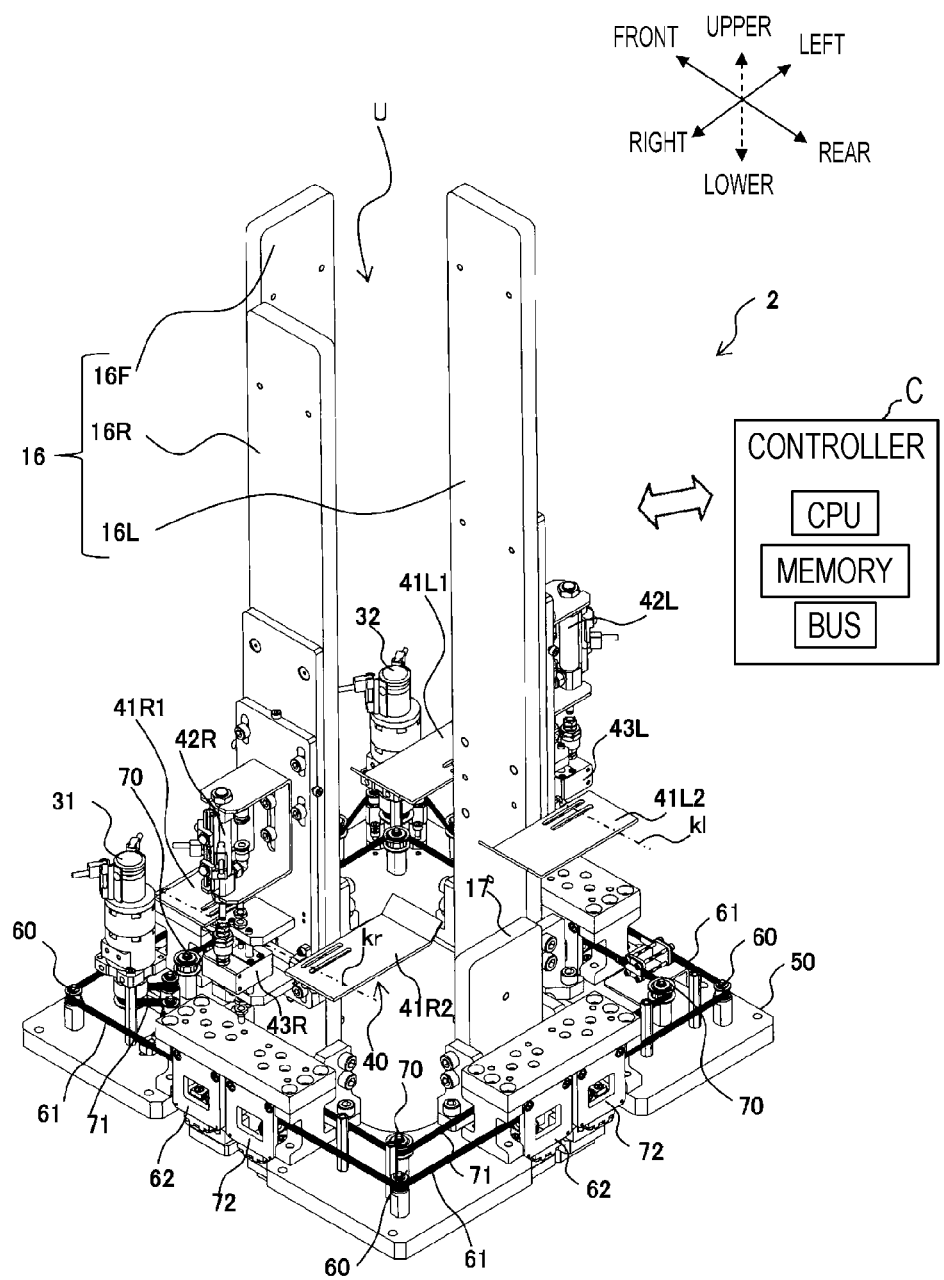
FIG. 7 is a perspective view from the right rear illustrating an example of the configuration of the lid supply device.
Figure 9:
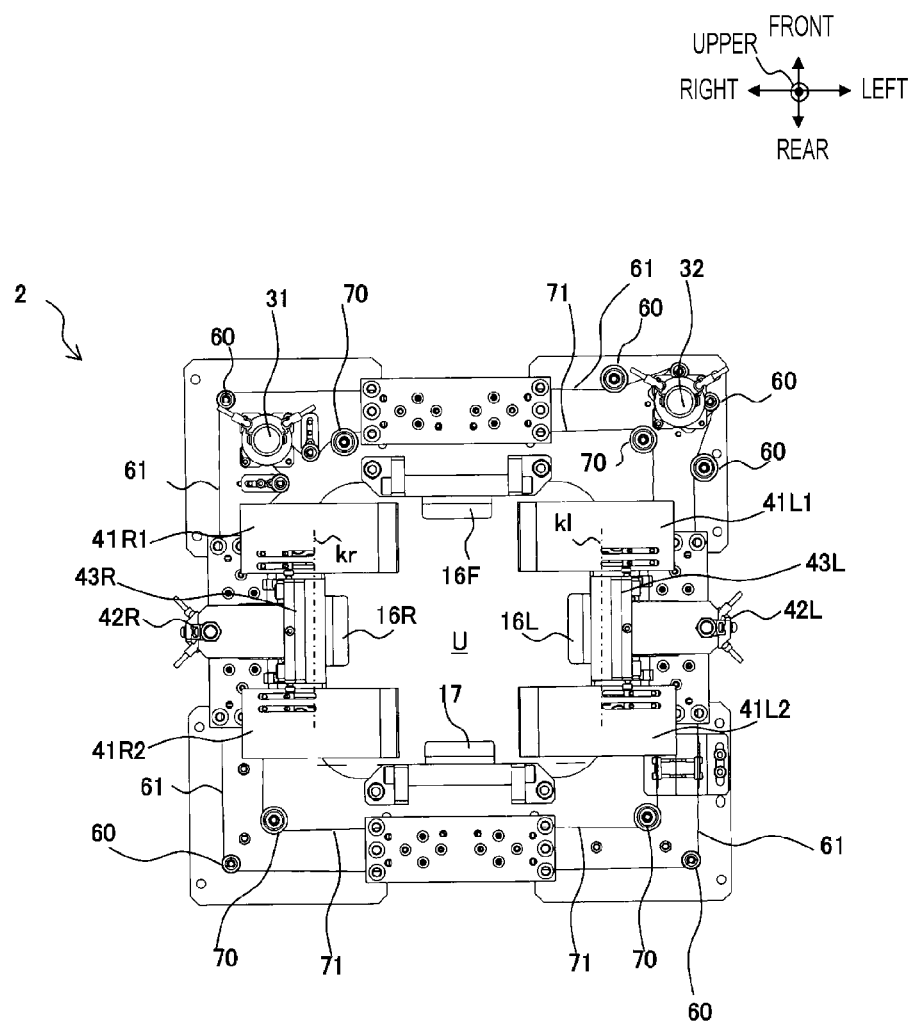
FIG. 9 is a top view illustrating an example of the configuration of the lid supply device.

As illustrated in FIGS. 7 and 9, the upper claw drive actuator 32 includes, for example, an air rotary actuator, and is provided in the left front corner of the base 50. The rotational driving force of the upper claw drive actuator 32 is transmitted to an upper claw drive belt 61 spanning the pulleys 60 provided at locations along the vicinity of the outer edge of the substantially square of the base 50 via an appropriate transmission mechanism located below the upper claw drive actuator 32, and drives the upper claw drive belt 61. The drive of the upper claw drive belt 61 is transmitted to the base portion 22a of the right upper claw 22R, the left upper claw 22L, the front upper claw 22F, and the rear upper claw 22B via four drive portions 62 provided on a right side portion, a left side portion, a front side portion, and a rear side portion of the base 50, respectively, whereby the right upper claw 22R, the left upper claw 22L, the front upper claw 22F, and the rear upper claw 22B are driven to advance and retreat. That is, the right upper claw 22R, the left upper claw 22L, the front upper claw 22F, and the rear upper claw 22B are driven to advance and retreat by one common upper claw drive actuator 32 which is unique to the claws (e.g., a first actuator). When the upper claw drive actuator 32 moves the right upper claw 22R, the left upper claw 22L, the front upper claw 22F, and the rear upper claw 22B toward the lid 12, these right upper claw 22R, left upper claw 22L, front upper claw 22F, and rear upper claw 22B support the second lid 12 sequentially stacked on the first lid 12 in the plurality of stacked lids 12 as described above (see, e.g., the lid 12B of FIG. 17 described later). Meanwhile, when the upper claw drive actuator 32 causes the right upper claw 22R, the left upper claw 22L, the front upper claw 22F, and the rear upper claw 22B to retreat to the side opposite to the lid 12, the right upper claw 22R, the left upper claw 22L, the front upper claw 22F, and the rear upper claw 22B release the lid 12. In addition, for example, when there is a margin in the space of the base 50, the right upper claw 22R, the left upper claw 22L, the front upper claw 22F, and the rear upper claw 22B may be respectively driven by separate actuators and all claws may be driven by a plurality of actuators.

Lower Claw Drive Actuator

As illustrated in FIGS. 7 and 9, the lower claw drive actuator 31 includes, for example, an air rotary actuator, and is provided in the right front corner of the base 50. The rotational driving force of the lower claw drive actuator 31 is transmitted to a lower claw drive belt 71 spanning the pulleys 70 provided at locations along the slightly inner side of the substantially square shape of the base 50 (e.g., a more inner side than the location where the pulley 60 is arranged) via an appropriate transmission mechanism located below the lower claw drive actuator 31, and drives the lower claw drive belt 71. The drive of the lower claw drive belt 71 is transmitted to the base portion 22*a* of the right lower claw 21R, the left lower claw 21L, the front lower claw 21F, and the rear lower claw 21B via four drive portions 72 provided on a right side portion, a left side portion, a front side portion, and a rear side portion of the base 50, respectively, whereby the right lower claw 21R, the left lower claw 21L, the front lower claw 21F, and the rear lower claw 21B are driven to advance and retreat. That is, the right lower claw 21R, the left lower claw 21L, the front lower claw 21F, and the rear lower claw 21B are driven to advance and retreat by one common lower claw drive actuator 31 which is unique to the claws (e.g., a first actuator). When the lower claw drive actuator 31 moves the right lower claw 21R, the left lower claw 21L, the front lower claw 21F, and the rear lower claw 21B toward the lid 12, these right lower claw 21R, left lower claw 21L, front lower claw 21F, and rear lower claw 21B support the lid 12 located at the lowermost position of the plurality of stacked lids 12 as described above (see, e.g., the lid 12A of FIGS. 16 and 17, and the lid 12B of FIG. 19). Meanwhile, when the lower claw drive actuator 32 causes the right lower claw 21R, the left lower claw 21L, the front lower claw 21F, and the rear lower claw 21B to retreat to the side opposite to the lid 12, the right lower claw 21R, the left lower claw 21L, the front lower claw 21F, and the rear lower claw 21B release the lid 12. In addition, as described above, for example, when there is a margin in the space of the base 50, the right lower claw 21R, the left lower claw 21L, the front lower claw 21F, and the rear lower claw 21B may be respectively driven by separate actuators, and all claws may be driven by a plurality of actuators.

Suction Pad

The suction pad 35 (e.g., a separation member) is attached to the upper end of a rod assembly 36 which extends in the vertical direction as illustrated in FIG. 4 described above (see, e.g., also FIGS. 15 to 20 described later). The lower portion of the rod assembly 36 is provided in the lid transfer device 4 in this example, and is connected to a demounting drive actuator 37 configured with, for example, an air cylinder. The demounting drive actuator 37 causes the suction pad 35 to reciprocate in the vertical direction via the rod assembly 36 so that the suction pad 35 sucks the lids 12 located at the lowermost position of the plurality of stacked lids 12 (see, e.g., the lid 12A of FIGS. 16 and 17 to be described later). When the lid 12 is sucked, the suction pad 35 is driven downward by the demounting drive actuator 37, so that the lid 12 at the lowermost position is separated (e.g., demounted) from the other lids 12. Thereafter, when the suction pad 35 releases the suction, the lid 12 located at the lowermost position of the plurality of stacked lids is delivered to the lid transfer device 4 and mounted on the transfer base 82. As described above, when the chain 80 provided with the transfer base 82 is circulated and driven by the driving force of a servomotor, the lid 12 mounted on the transfer base 82 is transferred to the lid receiving position P of the lid closing robot 3 and is positioned at the lid receiving position P.

Lifting Mechanism

Figure 6:
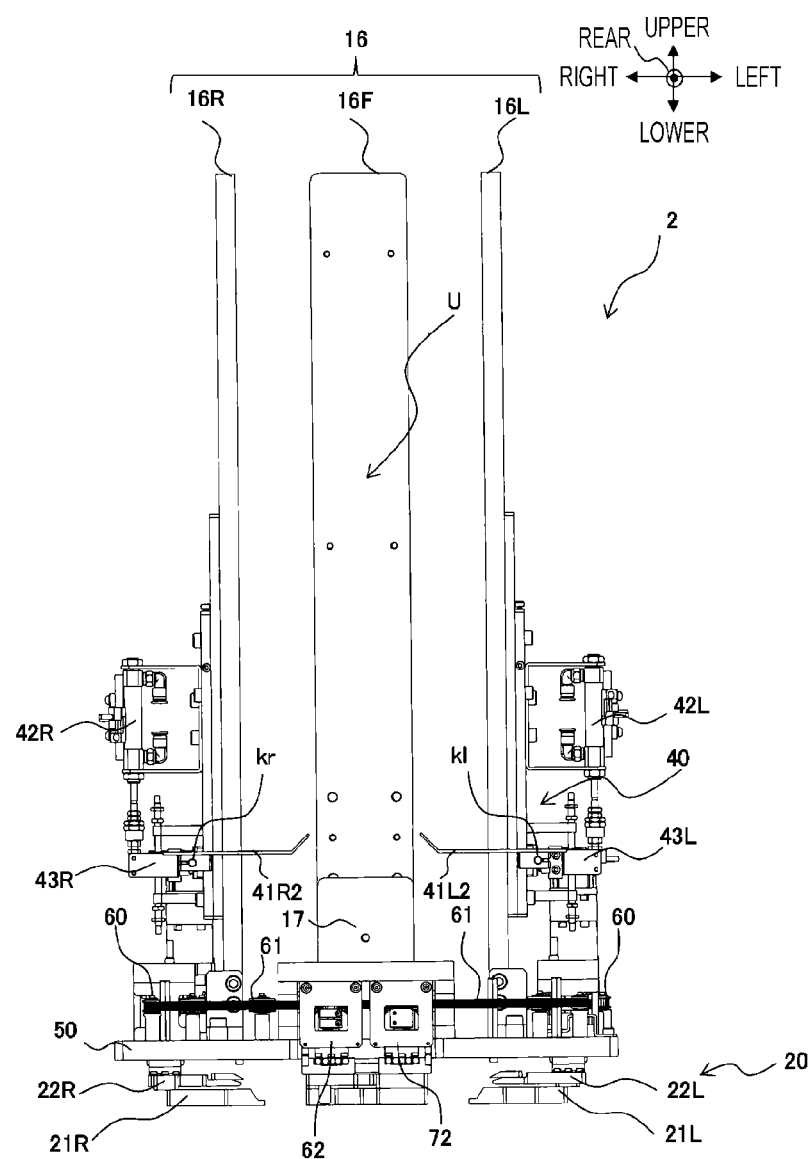
FIG. 6 is a rear view illustrating an example of the configuration of the lid supply device.
Figure 8:
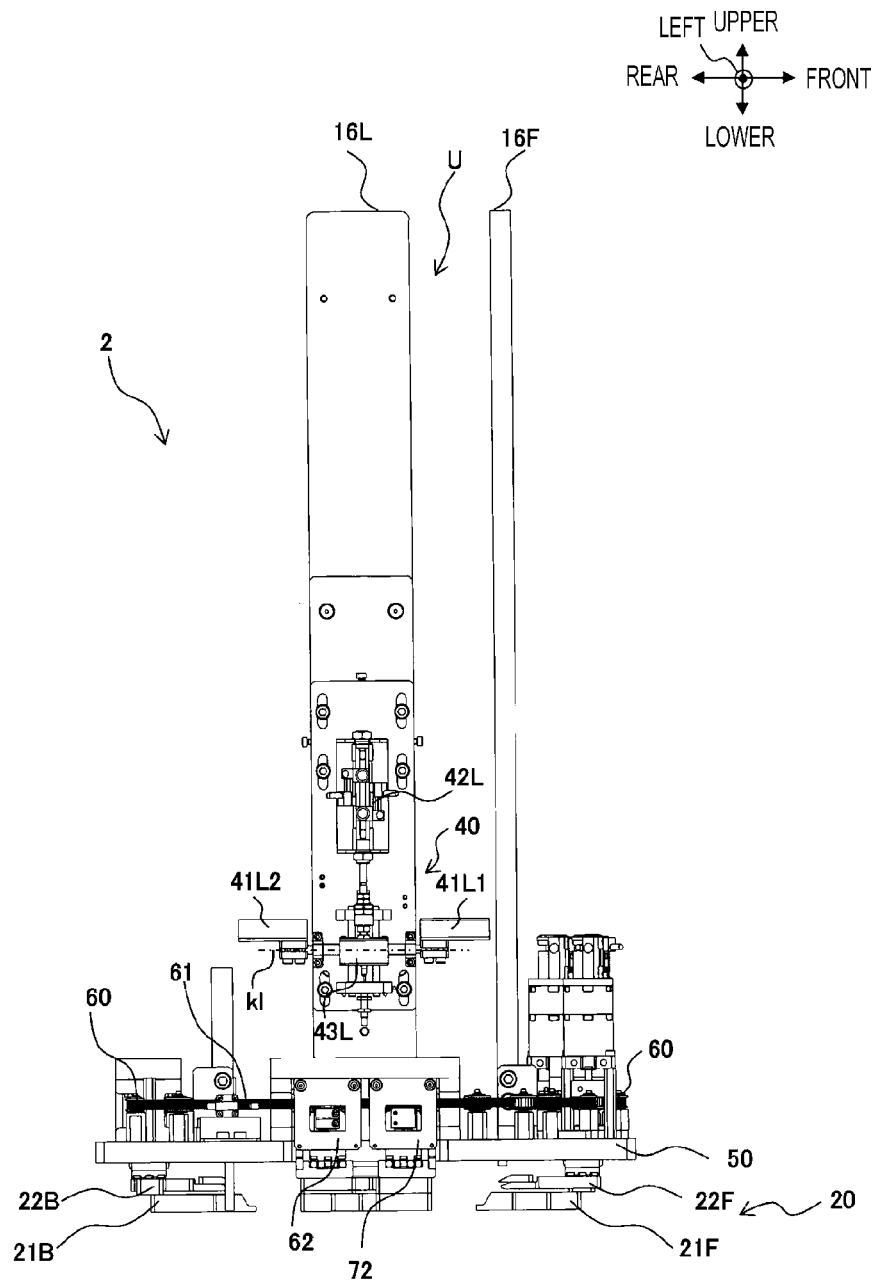
FIG. 8 is a side view from the left illustrating an example of the configuration of the lid supply device.

As illustrated in FIGS. 6 to 8 described above, the lifting mechanism 40 (e.g., a holding mechanism) is provided above the lower claw 21 and the upper claw 22 of the separation mechanism 20, and operates when the separation mechanism 20 separates one lid 12 from the other lid 12. That is, the lifting mechanism 40 supports the remaining lids 12 other than at least three lids 12 (e.g., thirteen lids in the example to be explained with reference to FIG. 17 described later) on the lower end side of the plurality of stacked lids 12, and lifts the remaining lids 12 upward by a predetermined distance.

The lifting mechanism 40 has an opening/closing claw 41 (e.g., a holding member) and an opening/closing actuator 42. The opening/closing actuator 42 includes two elements (i.e., a left opening/closing actuator 42L provided on the left guide plate 16L and a right opening/closing actuator 42R provided on the right guide plate 16R).

The opening/closing claw 41 is a member that supports the lid 12 located at the lowermost position among the remaining lids 12 by sandwiching the lid 12 from both left and right sides (e.g., at least one lid 12 above the lid 12 may also be sandwiched), and in this example, a total of four claws are provided. That is, first, on the right side of the lids 12 to be stacked, right opening/closing claws 41R1 and 41R2 are provided on the front side and the rear side of the right guide plate 16R, respectively. In addition, on the left side of the lids 12 to be stacked, left opening/closing claws 41L1 and 41L2 are provided on the front side and the rear side of the left guide plate 16L, respectively. Further, the number of opening/closing claws 41 is not limited to four as described above and may be more than four or less depending on how reliably it is necessary to perform the lifting function.

As illustrated in FIGS. 6 to 9 described above, the left opening/closing claws 41L1 and 41L2 are rotatably supported around an axis kl (e.g., a predetermined fulcrum) by a common rotation support mechanism 43L provided on the left guide plate 16L. The rotation support mechanism 43L is connected to the left opening/closing actuator 42L, and transmits the driving force of the left opening/closing actuator 42L to the left opening/closing claws 41L1 and 41L2. The right opening/closing claws 41R1 and 41R2 are rotatably supported around an axis kr (e.g., a predetermined fulcrum) by a common rotation support mechanism 43R provided on the right guide plate 16R. The rotation support mechanism 43R is connected to the right opening/closing actuator 42R, and transmits the driving force of the right opening/closing actuator 42R to the right opening/closing claws 41R1 and 41R2. Hereinafter, when the right opening/closing claws 41R1 and 41R2 and the left opening/closing claws 41L1 and 41L2 are collectively referred to without distinction, they are simply referred to as an "opening/closing claw 41." Further, the opening/closing claw 41 is configured to be replaceable according to the shape and size of the lid 12 to be processed.

Figure 12:
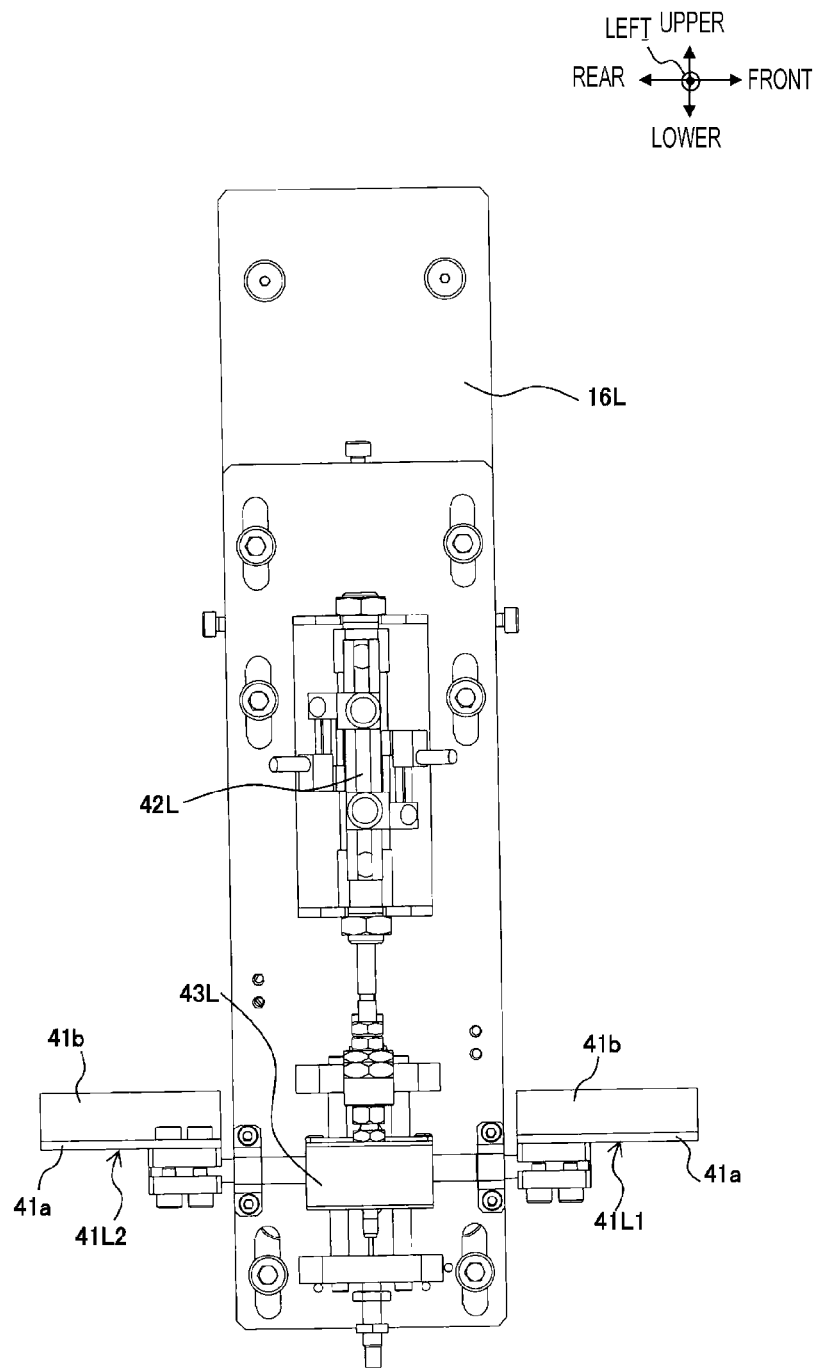
FIG. 12 is a side view from the left illustrating an example of a detailed structure of the left opening/closing claw and the surroundings thereof.
Figure 13:
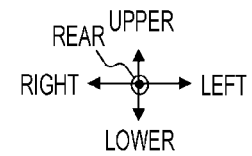
FIG. 13 is a rear view illustrating an example of a detailed structure of the left opening/closing claw and the surroundings thereof.
Figure 13:
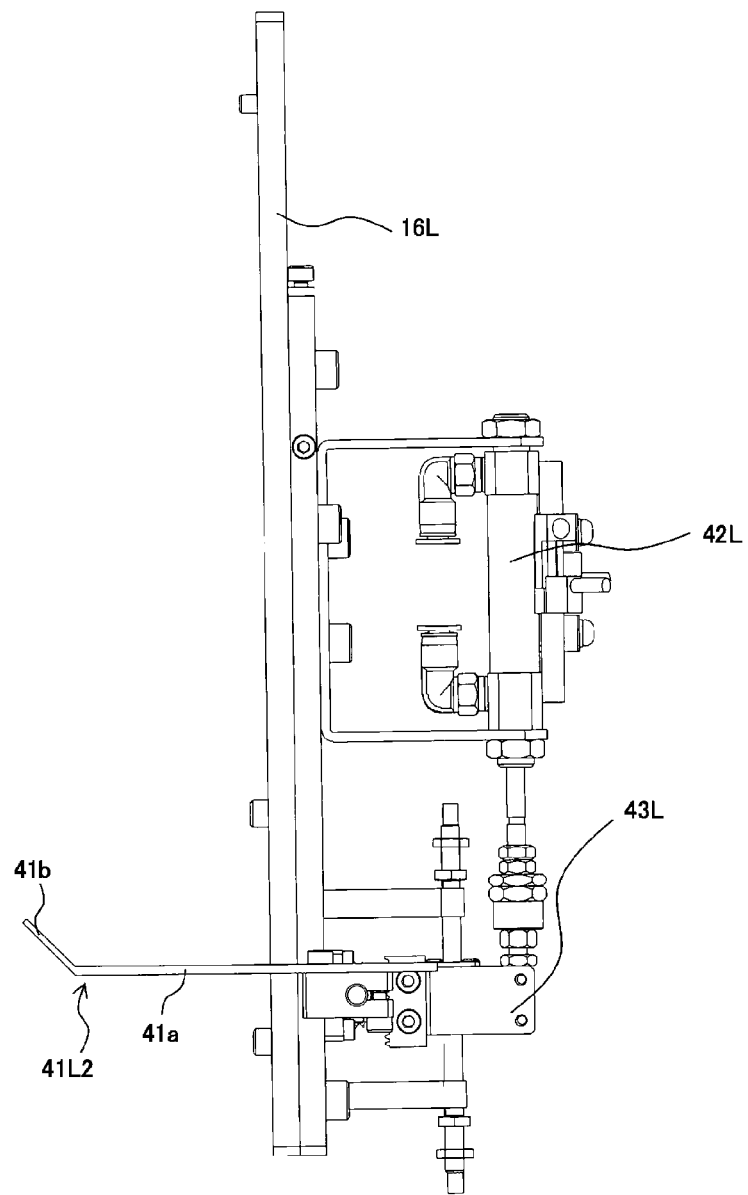
Figure 14:
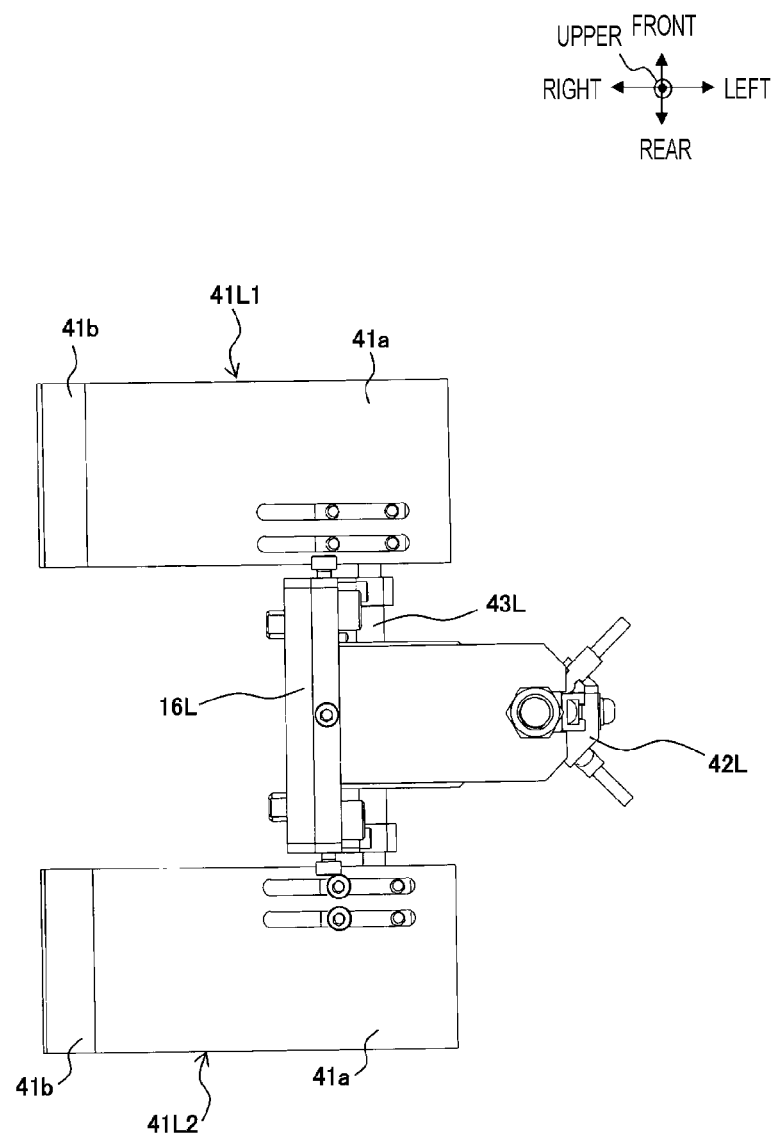
FIG. 14 is a top view illustrating an example of a detailed structure of the left opening/closing claw and the surroundings thereof.

The detailed structures of the left opening/closing claws 41L1 and 41L2 and the surroundings thereof are illustrated in FIGS. 12 to 14. As illustrated in FIGS. 12 to 14, in this example, the left opening/closing claws 41L1 and 41L2 include a main body portion 41*a* formed in a substantially quadrangular flat plate shape, and a bent portion 41*b* integrally provided to bend diagonally upward with respect to the end portion of the main body portion 41*a* on the lid 12 side. The right opening/closing claws 41R1 and 41R2 also have the same structure as the left opening/closing claws 41L1 and 41L2 (not illustrated), and function in the same manner as the left opening/closing claws 41L1 and 41L2.

The opening/closing actuators 42L and 42R (e.g., a second actuator) includes, for example, an air cylinder, and a rod portion is connected to the rotation support mechanisms 43L and 43R, respectively. By extending the rod portion, the opening/closing claw 41 is rotationally driven to raise the bent portion 41b on the lid 12 side of the opening/closing claw 41, and by shortening the rod portion, the opening/closing claw 41 is rotationally driven to lower the bent portion 41b on the lid 12 side of the opening/closing claw 41. In the present embodiment, hereinafter, a state in which the bent portion 41b is raised most and the opening/closing claw 41 is substantially horizontal (see, e.g., FIG. 15 described later) is referred to as a "horizontal position," a state in which the bent portion 41b is most lowered and the opening/closing claw 41 is substantially vertical (see, e.g., FIGS. 16 and 19 described later) is referred to as a "lower opening position" (e.g., a release state), and a state in which the bent portion 41b is slightly raised from the lower opening position, and abuts against the lid 12 and is lifted is referred to as a "lifting position."

When the opening/closing actuators 42L and 42R raise the bent portion 41b of the opening/closing claw 41 from the lower opening position, the opening/closing claw 41 is inserted into the lower portion of the lid 12 located at the lowermost position of the remaining lids 12, and supports and lifts the lid 12 located at the lowermost position and all the lids 12 located above the lowermost lid 12 (e.g., the lifting position as described above). The lifting amount of the opening/closing claw 41 at this time (e.g., a predetermined distance as described above) is sufficient as long as at least three lids 12 (e.g., thirteen lids in the above-described example) on the lower end side may be released from the weight of the remaining lids 12 located above the lower end side lids, and the value may be fixedly determined or may be variable. Meanwhile, when the opening/closing actuators 42L and 42R raise the bent portion 41b of the opening/closing claw 41, the opening/closing claw 41 deviates from the lid 12 located at the lowermost position and is separated from the lid 12 to release the lid 12 (e.g., the lower opening position as described above). Hereinafter, when these opening/closing actuators 42L and 42R are collectively referred to as appropriate, they are simply referred to as an "opening/closing actuator 42."

Further, the number of lids 12 (e.g., thirteen lids in the above example) which are left without being lifted by the lifting mechanism 40 is not particularly limited as long as the weight acting on the first lid 12 (e.g., the lowermost lid 12) and the second lid 12 sequentially stacked on the first lid 12 is sufficiently light in consideration of the strength of the lid 12. For example, the second or more lids 12 may be lifted while leaving only the first lid 12 (e.g., the lowermost lid 12), or about 20 number of lids 12 may be left.

Controller

As described above, the operations of the opening/closing actuator 42, the lower claw drive actuator 31, the upper claw drive actuator 32, and the demounting drive actuator 37 are controlled by the controller C. Further, the suction by the suction pad 35 and the release thereof are also controlled by the controller C. The controller C is configured as a computer including, for example, a CPU, a ROM, and a RAM. The controller C may also include a storage medium for storing a control program for performing the above controls. As for the storage medium, a flexible disk, a compact disk (CD), a CD-ROM, a hard disk, a flash memory, and a DVD may be used. The storage medium may temporarily store the control program which may be loaded to the computer to be executed. Alternatively, the control program may be loaded from an external device via, for example, a dedicated communication network. Meanwhile, the hardware configuration of the controller C is not necessarily limited to the configuration of each function module by the program. For example, each function module of the controller C may be configured by a dedicated logic circuit or an application specific integrated circuit (ASIC).

Lid Supply Operation

Next, an example of the lid supply method by the lid supply device 2 and an example of each operation of the lid supply device 2 in the lid supply method will be described with reference to FIGS. 15 to 21. FIGS. 15 to 20 are explanatory diagrams illustrating an example of a lid supply operation performed by the lid supply device 2 in the lid supply method. FIG. 21 is a flowchart illustrating an example of the lid supply method by the lid supply device 2.

As illustrated in FIG. 21, in step S10, the lid supply device 2 stacks the plurality of lids 12 introduced into the inner space U in the vertical direction.

Figure 15:
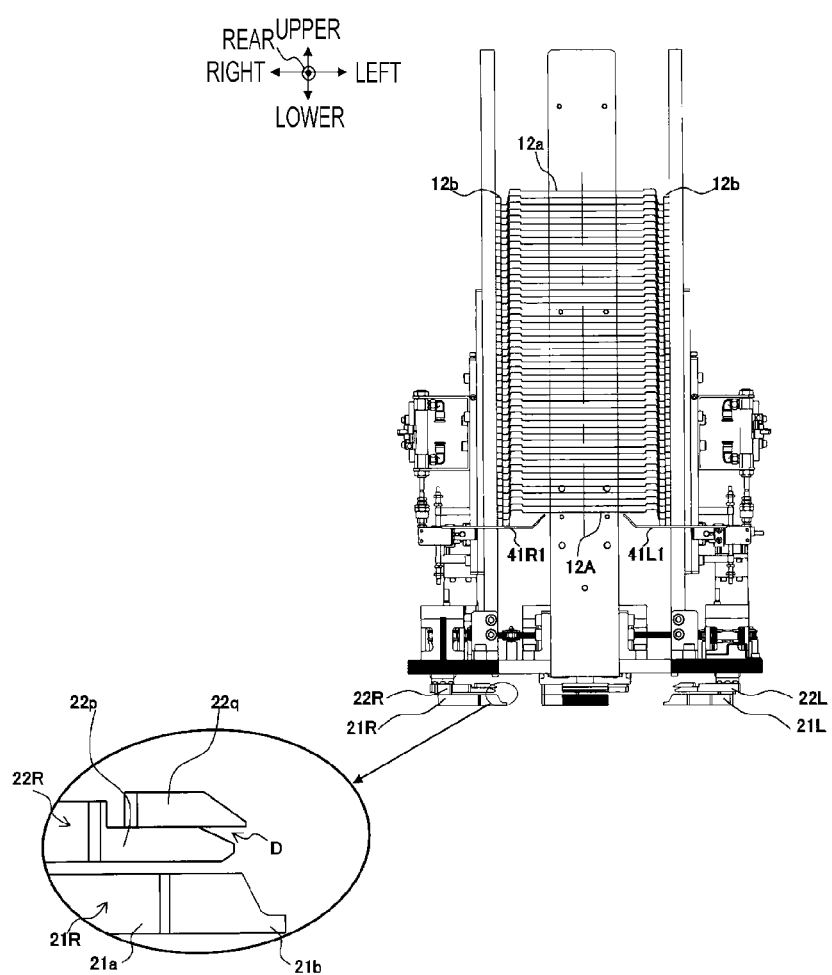
FIG. 15 is a rear view illustrating an example of a lid supply operation by a lid supply device in a simplified manner.

FIG. 15 illustrates an example of the operation of the lid supply device 2 performed in step S10. As illustrated in FIG. 15, when the lower claw drive actuator 31, the upper claw drive actuator 32, and the opening/closing actuator 42 are driven by the control of the controller C, the lower claw 21 is caused to move (advance) toward the lid 12 in the forward direction and the upper claw 22 is caused to retreat to be separated from the lid 12, and the opening/closing claw 41 is set to the horizontal position. In this state, when a plurality of lids 12 is introduced into the internal space U from above the auxiliary guide plate 17 by the operator, the introduced lids 12 are vertically stacked on the opening/closing claw 41 in a substantially horizontal state. That is, the plurality of lids 12 are held at predetermined height direction positions by the opening/closing claw 41 (e.g., a holding state). At this time, the first lid 12A (e.g., a first container) which is the lowermost lid 12 of the plurality of lids 12 is contacted and supported by the opening/closing claw 41 from below.

In step S20, the lid supply device 2 supports the lid 12A positioned at the lowermost position of the plurality of lids 12 stacked in the vertical direction by mounting the lid 12A on the lower claw 21.

Figure 16:
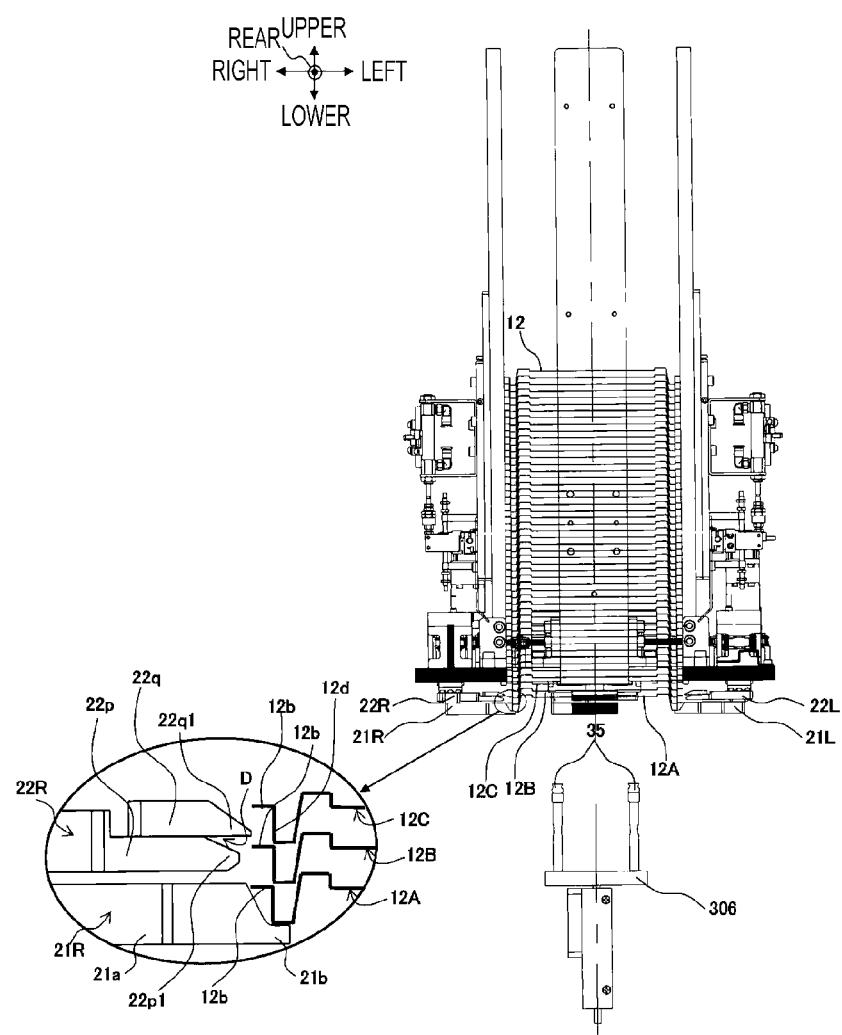
FIG. 16 is a rear view illustrating an example of a lid supply operation by a lid supply device in a simplified manner.

FIG. 16 illustrates an example of the operation of the lid supply device 2 performed in step S20. As illustrated in FIG. 16, the opening/closing actuator 42 is driven by the control of the controller C, and the opening/closing claw 41 is set to the lower opening position. Thus, the plurality of lids 12 held at the predetermined height direction positions as described above are released and displaced (fall) downward by gravity (e.g., a release state). At that time, the first lid 12A placed on the opening/closing claw 41 in the holding state described above is contacted and supported from below by the lower claw 21 which has been advanced in advance as described above (see, e.g., the enlarged view in FIG. 16). Further, at this point in time, the upper claw 22 is in the retreating position, and is separated from the second lid 12B and the third lid 12C among the plurality of lids 12 (see, e.g., the enlarged view in FIG. 16).

In step S30, the lid supply device 2 inserts the flange portion 12b of the second lid 12B among the plurality of lids 12 into the recess D of the upper claw 22, and mounts the second lid 12B on the upper claw 22.

Figure 17:
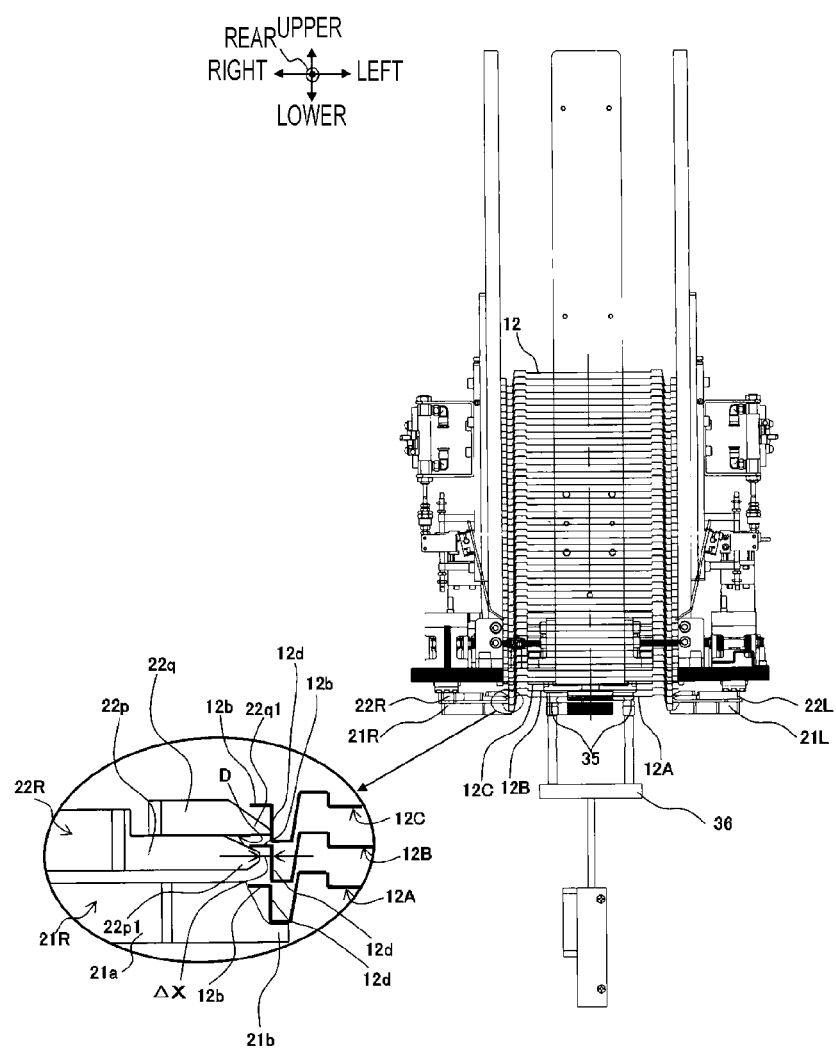
FIG. 17 is a rear view illustrating an example of a lid supply operation by a lid supply device in a simplified manner.

FIG. 17 illustrates an example of the operation of the lid supply device 2 performed in step S30. As illustrated in FIG. 17, the opening/closing actuator 42 is driven by the control of the controller C, and the opening/closing claw 41 is set to the lifting position. As a result, the opening/closing claw 41 comes into contact with the outer circumference (e.g., the flange portion 12b in this example) of one lid 12 located directly above the plurality of lids 12 on the lower end side (e.g., thirteen lids in this example), and lifts the one lid 12 along with the plurality of lids 12 stacked above the one lid 12 upward by the predetermined distance described above. Thus, the plurality of lids 12 on the lower end side are released from the weight of the plurality of lifted lids 12. Then, in this state, the upper claw drive actuator 32 is further driven by the control of the controller C to advance the upper claw 22 toward the lid 12. As a result, the flange portion 12b of the second lid 12B (e.g., a second container) is inserted into the recess D of the upper claw 22. Specifically, the lower wall portion 22p of the upper claw 22 abuts against the flange portion 12b of the second lid 12B to mount the flange portion 12b of the second lid 12B and support the second lid 12B. Further, at this time, the upper wall portion 22q of the upper claw 22 horizontally presses the body portion 12d of the third lid 12C (e.g., a third container) to support the third lid 12C (see, e.g., the enlarged view in FIG. 17). Further, when the upper wall portion 22q presses and supports the body portion 12d of the third lid 12C in this way, the lower wall portion 22p is separated from the body portion 12d of the second lid 12B by a distance Δx (see, e.g., the enlarged view in FIG. 17).

In step S40, in a state where the second lid 12B is supported by the upper claw 22, the first lid 12A is separated from the second lid 12B by sucking (e.g., adsorbing) the first lid 12A mounted on the lower claw 21 at the lowermost position.

Figure 18:
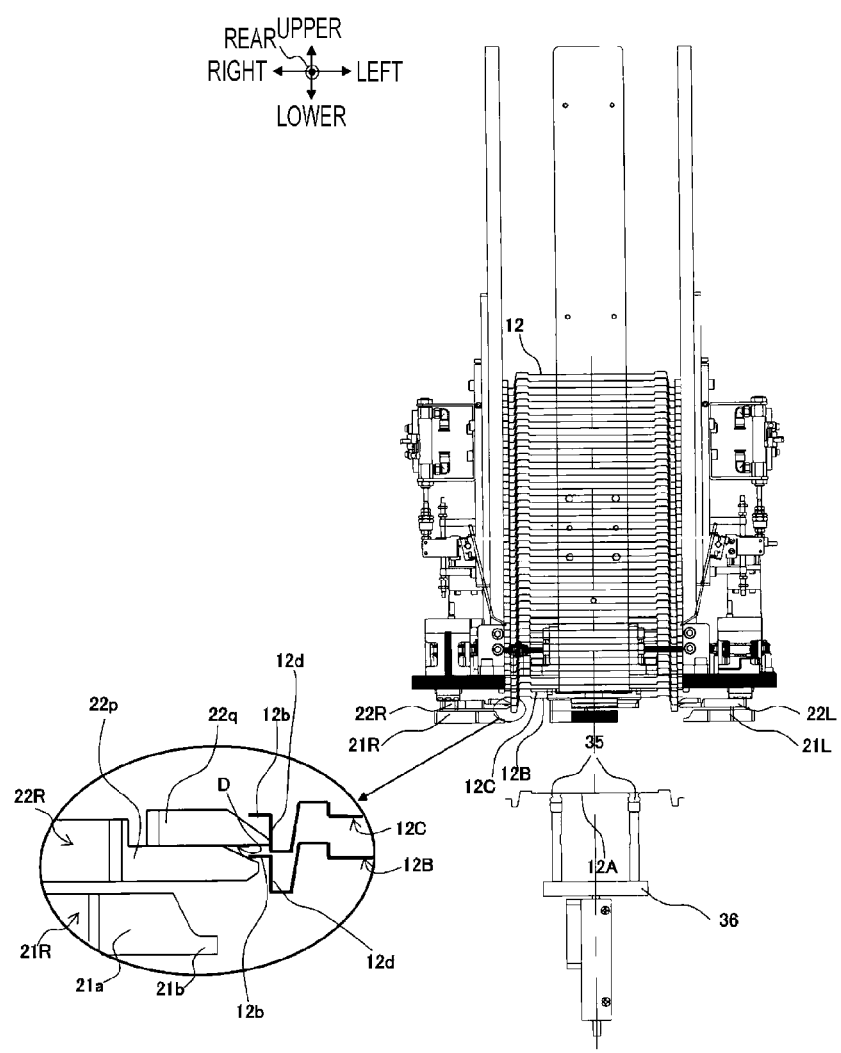
FIG. 18 is a rear view illustrating an example of a lid supply operation by a lid supply device in a simplified manner.

FIG. 18 illustrates an example of the operation of the lid supply device 2 performed in step S40. As illustrated in FIG. 18, the demounting drive actuator 37 is driven by the control of the controller C, and the suction pad 35 is moved upward to suck the first lid 12A which is the lowermost lid 12 in the plurality of stacked lids 12. After the suction, when the lower claw drive actuator 31 and the demounting drive actuator 37 are driven by the control of the controller C, the lower claw 21 retreats and is separated from the first lid 12A and the suction pad 35 moves downward. As a result, the first lid 12A sucked by the suction pad 35 is released from the lower claw 21, and the first lid 12A is separated (e.g., demounted) from the stacked body of a group of lids 12 including the second and third lids 12B and 12C and a plurality of lids 12 stacked with the second and third lids 12B and 12C, and moves downward. Then, when the first lid 12A is lowered to the position of the transfer base 82 of the lid transfer device 4, the suction by the suction pad 35 is released by the control of the controller C, so that the first lid 12A is mounted on the transfer base 82. As a result, the first lid 12A is transferred to the lid receiving position P of the lid closing robot 3 by the lid transfer device 4.

In step S50, the second lid 12B supported by the upper claw 22 is released from the upper claw 22 and is mounted on the lower claw 21.

Figure 19:
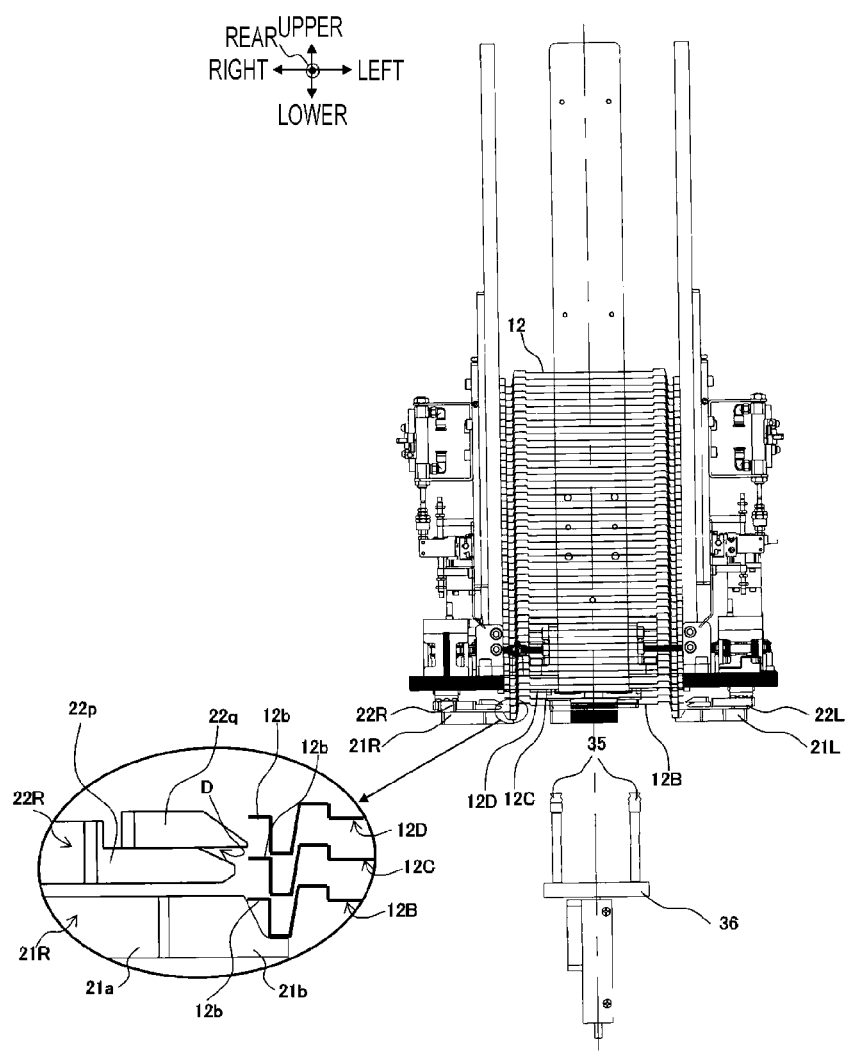
FIG. 19 is a rear view illustrating an example of a lid supply operation by a lid supply device in a simplified manner.

FIG. 19 illustrates an example of the operation of the lid supply device 2 performed in step S50. As illustrated in FIG. 19, when the lower claw drive actuator 31 and the upper claw drive actuator 32 are driven by the control of the controller C, the lower claw 21 is caused to move (e.g., advance) toward the lid 12 in the forward direction and the upper claw 22 is caused to retreat to be separated from the lid 12.

As a result, as described above, the second lid 12B supported by the upper claw 22 is released, displaced (e.g., falls) downward by gravity, and is contacted and supported from below by the lower claw 21 which has been advanced (see, e.g., the enlarged view in FIG. 19). This is the same state as the state in which the first lid 12A is separated (e.g., demounted) from the plurality of lids 12 stacked in the order of the first lid 12A, the second lid 12B, the third lid 12C, . . . from the bottom in FIG. 16 described above, and the remaining lids 12 are stacked in the order from the second lid 12B, the third lid 12C, . . . from the bottom (see, e.g., the enlarged view in FIG. 19). Therefore, in a state where the second lid 12B is placed at the lowermost position, the second lid 12B is separated (e.g., demounted) by performing the same operations illustrated in FIGS. 17 to 19. By repeating the same operations further, the plurality of lids 12 introduced into the internal space U are separated one by one from the bottom and reduced.

In step S60, steps S40 and S50 are repeatedly performed for the remaining lids 12.

Figure 20:
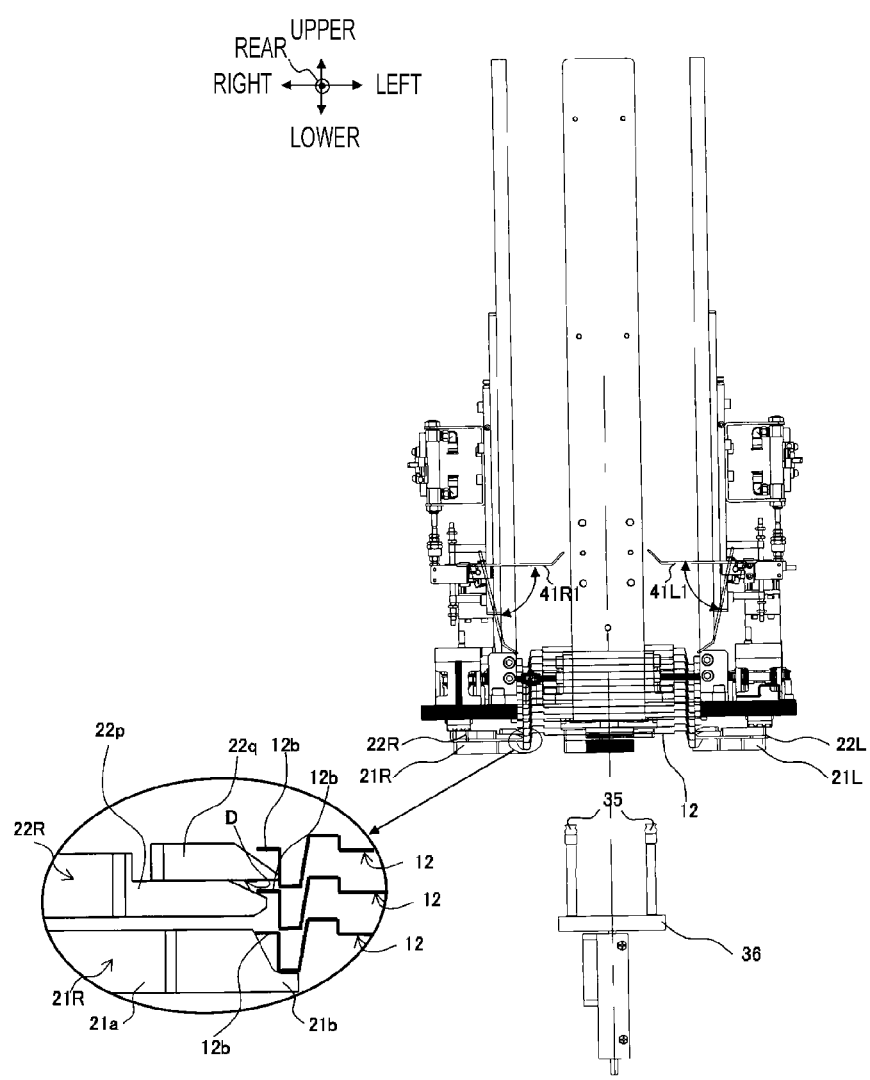
FIG. 20 is a rear view illustrating an example of a lid supply operation by a lid supply device in a simplified manner.
Figure 21:
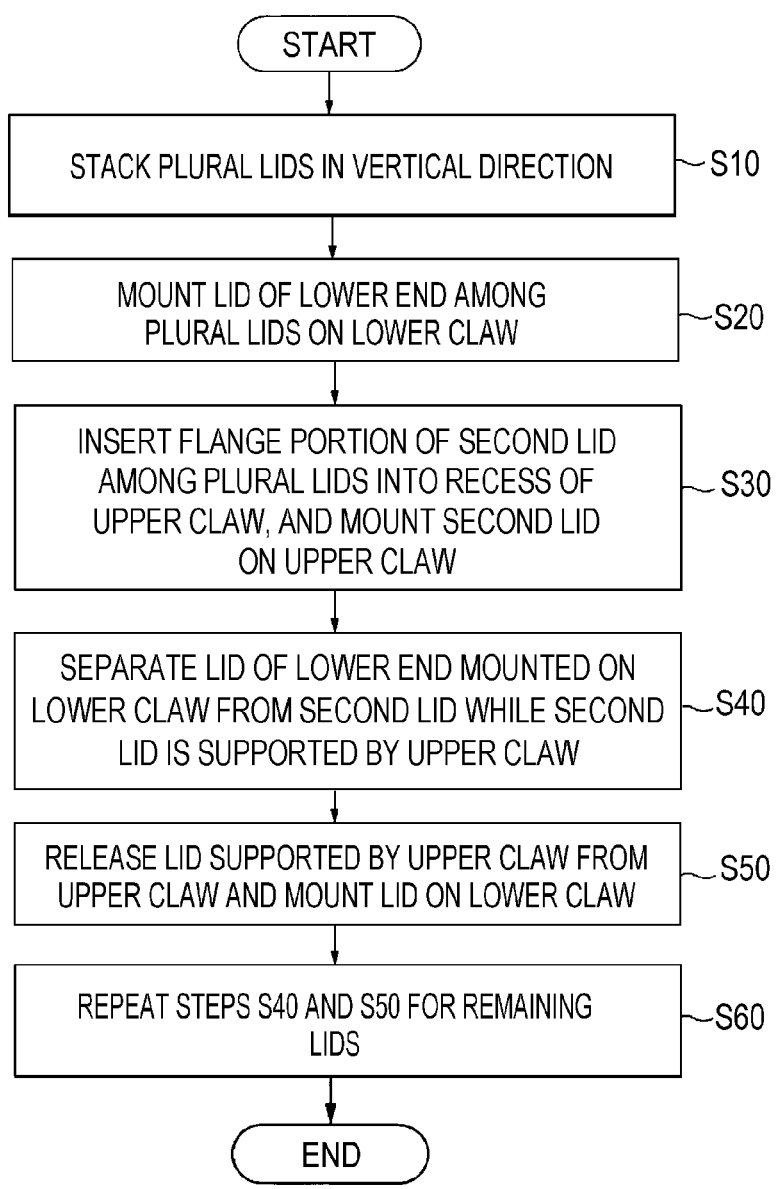
FIG. 21 is a flowchart illustrating an example of a lid supply method by a lid supply device.

FIG. 20 illustrates an example of the operation of the lid supply device 2 performed in step S60. FIG. 20 illustrates a state in which the number of remaining lids 12 becomes thirteen as a result of the number of lids 12 being reduced one by one as described above. In this state, the lid 12 does not exist within the movable range of the opening/closing claw 41 from the horizontal position to the lower opening position (see, e.g., the bidirectional arrow in FIG. 20). Thereafter, the separation (e.g., demounting) of the lid 12 at the lowermost position may be performed while supporting the second lid 12B (e.g., a lid sequentially stacked on the lowermost lid in the stack) with the upper claw 22 as described above using FIGS. 17 and 18 without performing the above-mentioned lifting operation by the opening/closing claw 41. Further, the opening/closing actuator 42 may be driven even at a timing other than, for example, the timing of performing the above-mentioned lifting by using a relationship between the movable range of the opening/closing claw 41 and the number of lids 12, so that the opening/closing claw 41 always comes into contact with the plurality of lids 12 stacked with a constant light pressing force from the side. In this case, when the lid 12 disappears within the movable range as illustrated in FIG. 20, it may be detected that the number of lids 12 has reduced as a result of the opening/closing claw 41 jumping up to the horizontal position due to the pressing force.

Effect of Embodiment

As described above, in the lid supply device 2 of the present embodiment, a plurality of lids 12 is stacked in the vertical direction while being guided by the guide plate 16. When the first lid 12A which is the lowermost lid in the plurality of stacked lids 12 is mounted on the lower claw 21, the plurality of lids 12 are supported as a whole. Then, when each of the lids 12 is taken out one by one from the plurality of lids 12, for example, when the first lid 12A is taken out, the flange portion 12b of the second lid 12B is inserted into the recess D provided in the upper claw 22, and the first lid 12A is separated from the second lid 12B by the suction pad 35 in that state. As described above, in the present embodiment, when the first lid 12A is separated, the flange portion 12b of the second lid 12B sequentially stacked on the first lid 12A is inserted into the recess D and held. As a result, since the second lid 12B may be held with high reliability as compared with the case where the second lid 12B is simply placed and supported, the first lid 12A located at the lowermost position may be reliably separated.

Further, in the present embodiment, in particular, in the recess D, the flange portion 12b of the second lid 12B is mounted by the lower wall portion 22p of the upper claw 22, and the upper wall portion 22q above the recess D supports the third lid 12C sequentially stacked on the second lid 12B. In this way, by supporting the second lid 12B together with the third lid 12C which is integrated without being separated, the second lid 12B may be reliably held with high reliability.

Further, in the present embodiment, in particular, in the upper claw 22, the upper wall portion 22q is designed to be larger (e.g., longer) than the lower wall portion 22p and protrudes toward the plurality of lids 12. Thus, even when the upper claw 22 is caused to advance toward the lid 12 and the upper wall portion 22q contacts and supports the body portion 12d of the third lid 12C, the lower wall portion 22p may remain in a state in which the flange portion 12b of the second lid 12B is mounted and may be maintained in a non-contact state with the body portion 12d of the second lid 12B. As a result, since the second lid 12B may be prevented from being deformed when supported by the upper claw 22, the first lid 12A may be smoothly separated from the second lid 12B.

Further, in the present embodiment, in particular, in the upper claw 22, the upper wall portion 22q is attached to the lower wall portion 22p so that the amount of protrusion is adjustable. Thus, the difference in the amount of protrusion of the upper wall portion 22q and the lower wall portion 22p toward the lid 12 may be set according to the amount of deformation that may be assumed based on the shape, material, and rigidity of the lids 12 to be stacked.

Further, in the present embodiment, in particular, the lower wall portion 22p of the upper claw 22 includes a tapered portion 22p1 that tapers toward the tip end. As a result, when the upper claw 22 is caused to advance to insert the lower wall portion 22p from below the flange portion 12b of the second lid 12B, the insertion operation may be smoothly performed while suppressing interference.

Further, in the present embodiment, in particular, the upper wall portion 22q of the upper claw 22 includes a tapered portion 22q1 that tapers toward the tip end. As a result, when the upper claw 22 is caused to advance to bring the upper wall portion 22q into contact with the body portion 12d of the third lid 12C, the insertion operation may be smoothly performed while suppressing interference with the surroundings.

In addition, in the present embodiment, particularly when the first lid 12A is separated, the flange portion 12b of the second lid 12B is inserted into the recess D of the upper claw 22, and the lower wall portion 22p mounts the flange portion 12b of the second lid 12B. As a result, the flange portion 12b of the second lid 12B may be stably held in the recess D.

Further, in the present embodiment, in particular, the upper wall portion 22q of the upper claw 22 presses the body portion 12d of the third lid 12C to support the third lid 12C. As a result, when the integrated second lid 12B and third lid 12C are supported by the upper claw 22, the third lid 12C may be firmly supported by the upper wall portion 22q of the upper claw 22.

Further, in the present embodiment, the upper claw 22 is configured such that when the upper wall portion 22q presses and supports the body portion 12d of the third lid 12C, the lower wall portion 22p is separated from the body portion 12d of the second lid 12B. Thus, even when the upper claw 22 is caused to advance toward the lid 12 and the upper wall portion 22q presses and supports the body portion 12d of the third lid 12C, the lower wall portion 12p maintains a non-contact state with the body portion 12d of the second lid 12B. As a result, deformation of the second lid 12B when supported by the upper claw 22 may be prevented, and the first lid 12A may be smoothly and reliably separated from the second lid 12B.

In addition, in the present embodiment, at least one of the lower claw 21 and the upper claw 22 (e.g., both claws in the above-mentioned example) supports the lid 12 from four directions of front, rear, left, and right. Thus, the first lid 12A may be separated stably and reliably.

Further, in the present embodiment, at least one of the lower claw 21 and the upper claw 22 provided at the four locations (e.g., both claws in the above-mentioned example) is driven to advance and retreat with respect to a plurality of lids 12 stacked in the vertical direction by one lower claw drive actuator 31 unique to the lower claw 21 and one upper claw drive actuator 32 unique to the upper claw 22. As a result, since the installation space may be reduced as compared with the case of providing a drive actuator in each of the four lower claws 21 or providing a drive actuator in each of the four upper claws 22, the lid supply device 2 as a whole may be made compact.

Further, in the present embodiment, first, when the lid supply device 2 starts operation, the opening/closing claw 41 is driven to the horizontal position. Thus, the operator may insert and arrange the plurality of lids 12 along the guide direction of the guide plate 16 and smoothly stack the plurality of lids 12 in the correct posture at a position above the lower claw 21 and the upper claw 22. Thereafter, the lower claw 21 moves in the advancing direction, and in that state, the opening/closing claw 41 is switched from the horizontal position to the lower opening position. Then, the plurality of lids 12 stacked as described above are released and fall downward, and the first lid 12A located at the lowermost position in the stacked lids 12 is supported by the lower claw 21. As a result, it is possible to shift to a posture in which the plurality of lids 12 are separated one by one by the cooperation of the lower claw 21 and the upper claw 22 in a state where the plurality of lids 12 are stacked in the vertical direction in the above-mentioned correct posture.

Further, in the present embodiment, after the plurality of lids 12 are released from the opening/closing claw 41 driven to the lower opening position as described above and the first lid 12A located in the lowermost position of the stacked lids is supported by the lower claw 21, the opening/closing claw 41 is switched to the lifting position. Then, the remaining lids 12 except for three or more lids 12 (e.g., thirteen lids in the above example) on the lower end side are lifted upward by a predetermined distance. Then, in the lifted state, the upper claw 22 moves in the advancing direction, and holds the second lid 12B by inserting the flange portion 12b of the second lid 12B into the recess D as described above. As a result, when the upper claw 22 holds the second lid 12B, it is possible to prevent the second lid 12B from being deformed by the weight of lids 12 on the upper portion, and to hold the second lid 12B with high reliability.

Further, as the process in which the lids 12 are separated and supplied one by one progresses, the number of unprocessed lids 12 that have been stacked is gradually reduced. At this time, in order to ensure the continuous operation, the operator may additionally insert the lid 12 into the internal space U during operation. In such a case, by setting the opening/closing claw 41 to the lifting position, it is possible to prevent the weight of the additionally inserted lid 12 from being directly applied to the lower claw 21 or the upper claw 22. As a result, at the time of additional insertion, it is possible to avoid an unexpected accident such as that the lower claw 21 and the upper claw 22 fail to support the weight and the entire lids 12 are displaced downward.

Further, as described above, for example, by setting the pressing force acting in the lifting direction to a constant value in advance, it is possible to automatically detect that the number of the unprocessed lids 12 described above has decreased to a certain extent by the state of the opening/closing claw 41.

Further, in the present embodiment, in particular, the left opening/closing claws 41L1 and 41L2 and the right opening/closing claws 41R1 and 41R2 are configured to be rotatable around the axes kl and kr. As a result, in the lifting position, the left opening/closing claws 41L1 and 41L2 and the right opening/closing claws 41R1 and 41R2 are inserted into the lower ends of the plurality of lids 12 to mount and support the plurality of lids 12, while causing the left opening/closing claws 41L1 and 41L2 and the right opening/closing claws 41R1 and 41R2 to rotate around the axes kl and kr and setting to the lower opening position, whereby the lids 12 may be deviated from the lower ends.

Further, in the present embodiment, in particular, the left opening/closing actuator 42L and the right opening/closing actuator 42R are provided to generate a driving force for rotating the left opening/closing claws 41L1 and 41L2 and the right opening/closing claws 41R1 and 41R2. As a result, the left opening/closing claws 41L1 and 41L2 and the right opening/closing claws 41R1 and 41R2 may be rotated by the driving force of the left opening/closing actuator 42L and the right opening/closing actuator 42R, respectively, to switch between the lifting position and the lower opening position as described above.

Modification

The embodiment of the disclosure is not limited to the above-described embodiments, and various modifications may be made without departing from the spirit and technical idea. Hereinafter, such a modification will be described.

In the above-described embodiments, the case where the opening/closing actuator 42 and the demounting drive actuator 37 are configured by an air cylinder has been described as an example. However, the present disclosure is not limited thereto and may be configured by, for example, a solenoid or a servomotor. Further, although the case where the lower claw drive actuator 31 and the upper claw drive actuator 32 are configured by the air rotary actuator has been described as an example, the lower claw drive actuator 31 and the upper claw drive actuator 32 may be configured by, for example, a servomotor or a solenoid.

Further, in the above, after the lid 12 is lifted by the lifting mechanism 40, the lid 12 is released and freely dropped by the weight without performing an operation of lowering the lid 12, but the operation of lowering the lid 12 may be performed. As a result, it is possible to reduce the impact occurring when the lid 12 lifted by the lifting mechanism 40 is released.

The phrases such as "orthogonal," "parallel," and "plane" in the above description do not have a strict meaning. That is, these phrases "orthogonal," "parallel," and "plane" indicate "substantially orthogonal," "substantially parallel," and "substantially flat," respectively, while allowing, for example, tolerances and errors in design and manufacturing.

Further, in the above descriptions, the phrases such as "the same," "equivalent," and "different" in the external dimension, size, shape, or position do not have a strict meaning. That is, these phrases "the same," "equivalent," and "different" indicate "substantially the same," "substantially equivalent," and "substantially different," respectively, while allowing tolerances and errors in design and manufacturing.

According to the present disclosure, the container located at the lowermost position among the plurality of stacked lids may be reliably separated among a plurality of stacked containers.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A container supply device comprising:
a guide that guides stacking of a plurality of containers in a vertical direction;
a first support capable of advancing and retreating with respect to the plurality of containers to mount a first container located at a lowermost position of the plurality of stacked containers thereon;
a second support capable of advancing and retreating with respect to the plurality of containers, and including a recess into which an edge of a second container sequentially stacked on the first container in the plurality of stacked containers is inserted; and
a separator that separates the first container from the second container in a state where the second container is supported by inserting the edge of the second container into the recess of the second support,
wherein the second support includes a lower wall and an upper wall formed on an upper side of the lower wall to form the recess therebetween, and
an amount of protrusion of the upper wall of the second support in an advancing/retreating direction is larger than an amount of protrusion of the lower wall of the second support.

2. The container supply device according to claim 1, wherein the edge of the second container is mounted on the lower wall, and
the upper wall supports a third container sequentially stacked on the second container in the plurality of stacked containers.

3. The container supply device according to claim 2, wherein one of the upper wall and the lower wall of the second support is attached to a remaining one of the upper wall and the lower wall such that the amount of protrusion is adjustable.

4. The container supply device according to claim 2, wherein the lower wall includes a tapered portion that tapers toward a tip.

5. The container supply device according to claim 4, wherein the upper wall includes a tapered portion that tapers toward the tip.

6. The container supply device according to claim 2,
wherein the container includes a container main body portion located on a radial center side and a flange portion as the edge protruding on a radial outer side of the container main body portion, and
the lower wall of the second support abuts from below the flange portion of the second container to mount the flange portion of the second container thereon.

7. The container supply device according to claim 6, wherein the upper wall of the second support is configured to press a side of the container main body portion of the third container to support the third container.

8. The container supply device according to claim 7, wherein when the upper wall presses and supports the container main body portion of the third container, the second support is configured such that the lower wall is separated from the container main body portion of the second container.

9. The container supply device according to claim 2, wherein at least one of the first support and the second support is provided at four locations of one side and a remaining side in a first direction which is substantially orthogonal to the vertical direction with respect to the plurality of containers stacked in the vertical direction, and one side and a remaining side in a second direction which is substantially orthogonal to the vertical direction and substantially orthogonal to the first direction.

10. The container supply device according to claim 9, wherein the at least one support provided at the four locations is driven to advance and retreat with respect to the plurality of containers stacked in the vertical direction by a first actuator unique to the support.

11. The container supply device according to claim 1, further comprising:
a holder that is provided above the second support and is switchable between a holding state in which the plurality of containers are held at predetermined positions in a height direction and a release state in which the plurality of containers held at the predetermined positions are released and displaced downward from the predetermined positions,
wherein the first support moves in an advancing direction in advance before the holder is switched from the holding state to the release state, and when the holder is switched to the release state, the first support mounts the first container included in the plurality of containers displaced downward.

12. The container supply device according to claim 11, wherein the holder is further configured to support remaining containers except for at least three containers on the lower end side of the plurality of containers displaced downward in the release state, and be switchable to a lifting state in which the containers are lifted upward by a predetermined distance, and
when the remaining containers are lifted in the lifting state of the holder, the second support moves in the advancing direction and the edge of the second container is inserted into the recess.

13. The container supply device according to claim 11, wherein the holder is configured to be rotatable around a predetermined fulcrum and includes a bent portion that is inserted into the lower ends of the plurality of containers in the holding state to mount the plurality of containers and deviates from the lower ends of the plurality of containers in the release state.

14. The container supply device according to claim 13, further comprising:
a second actuator that generates a driving force to rotate the holder and the bent portion.

15. A system comprising:
the container supply device according to claim 1;
a container transfer device that transfers the first container separated by the container supply device to a container receiving position; and
a robot that grips and holds the first container transferred to the container receiving position by the container transfer device.

16. A container supply method comprising:
moving a first support in a direction substantially orthogonal to a vertical direction toward a plurality of containers guided by a guide and stacked in the vertical direction to mount a first container located at a lowermost position in the plurality of containers on the first support;
in a state where the first container is supported by the first support, moving a second support in the direction substantially orthogonal to the vertical direction toward the plurality of containers and inserting an edge of a second container sequentially stacked on the first container in the plurality of containers into a recess provided in the second support to mount the second container on the second support; and
in a state where the second container is supported by the second support, moving the first support away from the plurality of containers to separate the first container from the second container,
wherein the second support includes a lower wall and an upper wall formed on an upper side of the lower wall to form the recess therebetween, and
an amount of protrusion of the upper wall of the second support in an advancing/retreating direction is larger than an amount of protrusion of the lower wall of the second support.

17. A container supply device comprising:
a guide that guides stacking of a plurality of containers in a vertical direction;
a first support capable of advancing and retreating in a direction substantially orthogonal to the vertical direction with respect to the plurality of containers;
a second support capable of advancing and retreating in the direction substantially orthogonal to the vertical direction with respect to the plurality of containers and includes a recess to which an edge of a container is inserted to be mounted thereon; and
a controller configured to:
move the first support in the direction substantially orthogonal to the vertical direction toward the plurality of containers to mount a first container located at a lowermost position in the plurality of containers on the first support;
in a state where the first container is supported by the first support, move the second support in the direction substantially orthogonal to the vertical direction toward the plurality of containers and insert an edge of a second container sequentially stacked on the first container in the plurality of containers into the recess of the second support to mount the second container on the second support; and
in a state where the second container is supported by the second support, move the first support away from the plurality of containers to separate the first container from the second container,
wherein the second support includes a lower wall and an upper wall formed on an upper side of the lower wall to form the recess therebetween, and
an amount of protrusion of the upper wall of the second support in an advancing/retreating direction is larger than an amount of protrusion of the lower wall of the second support.

* * * * *